(12) United States Patent
Humair et al.

(10) Patent No.: US 12,478,468 B2
(45) Date of Patent: Nov. 25, 2025

(54) REPLACEMENT HEART VALVE HAVING IMPROVED PREFORMED SEAL

(71) Applicant: Symetis SA, Ecublens (CH)

(72) Inventors: Arnaud Humair, Mont-sur-Rolle (CH); Jean-Luc Hefti, Cheseaux-Noréaz (CH); Stephane Delaloye, Buelach (CH)

(73) Assignee: Symetis SA, Ecublens (CH)

(*) Notice: Subject to any disclaimer, the term of this patent is extended or adjusted under 35 U.S.C. 154(b) by 116 days.

(21) Appl. No.: 17/466,431

(22) Filed: Sep. 3, 2021

(65) Prior Publication Data
US 2022/0061984 A1   Mar. 3, 2022

(30) Foreign Application Priority Data
Sep. 3, 2020 (EP) .................... 20194408

(51) Int. Cl.
*A61F 2/24* (2006.01)

(52) U.S. Cl.
CPC .......... *A61F 2/2409* (2013.01); *A61F 2/2418* (2013.01); *A61F 2/2412* (2013.01); *A61F 2210/0014* (2013.01); *A61F 2210/0085* (2013.01); *A61F 2240/001* (2013.01)

(58) Field of Classification Search
CPC .............................. A61F 2/2418; A61F 2/2409
See application file for complete search history.

(56) References Cited

U.S. PATENT DOCUMENTS

| 2006/0004442 | A1 | 1/2006 | Spenser et al. |
| 2012/0022629 | A1* | 1/2012 | Perera ............... C08L 63/00 623/1.11 |

(Continued)

FOREIGN PATENT DOCUMENTS

| EP | 2898859 | 7/2015 |
| EP | 3679893 | 7/2020 |

OTHER PUBLICATIONS

"Extended European Search Report," for European Patent Application No. 20194408.9 mailed Jun. 30, 2021 (8 pages).

(Continued)

*Primary Examiner* — Sarah W Aleman
(74) *Attorney, Agent, or Firm* — Pauly, DeVries Smith & Deffner LLC

(57) ABSTRACT

Embodiments herein include a cardiac stent-valve for transcatheter delivery being compressible to a compressed state for delivery, and expandable to an expanded state for implantation. The stent-valve including a stent with an axial inflow end and an axial outflow end, a plurality of leaflets arranged within the stent, and a sealing skirt for reduction or prevention of paravalvular leakage. In the expanded state, the sealing skirt includes a tubular inner wall and at least one pocket which is positioned on the tubular inner wall and comprises an outer wall which extends radially outward from the tubular inner wall. The pocket is configured to be distended radially outward in response to inflow of blood in the expanded state. In the expanded state, the outer wall of the pocket includes one or more pre-shaped bulges which extend radially outward from the outer wall of the pocket. Other embodiments are also included herein.

20 Claims, 14 Drawing Sheets

(56) References Cited

U.S. PATENT DOCUMENTS

| | | | | |
|---|---|---|---|---|
| 2014/0350668 | A1* | 11/2014 | Delaloye | A61F 2/95 623/2.17 |
| 2015/0005863 | A1* | 1/2015 | Para | A61F 2/2418 623/1.2 |
| 2015/0209136 | A1 | 7/2015 | Braido et al. | |
| 2015/0209141 | A1 | 7/2015 | Braido et al. | |
| 2015/0327995 | A1* | 11/2015 | Morin | A61F 2/2436 623/2.17 |
| 2017/0189174 | A1* | 7/2017 | Braido | A61F 2/2436 |
| 2018/0021129 | A1* | 1/2018 | Peterson | A61F 2/2418 623/2.17 |
| 2018/0055631 | A1* | 3/2018 | Morin | A61F 2/2412 |
| 2019/0060063 | A1 | 2/2019 | Griffin et al. | |
| 2019/0201193 | A1* | 7/2019 | Delaloye | A61F 2/2412 |
| 2020/0069415 | A1* | 3/2020 | Bialas | A61F 2/243 |
| 2020/0121454 | A1 | 4/2020 | Spence | |
| 2020/0170778 | A1 | 6/2020 | Ehnes et al. | |
| 2022/0061986 | A1 | 3/2022 | Humair et al. | |
| 2023/0218390 | A1 | 7/2023 | Pisani et al. | |

OTHER PUBLICATIONS

"Extended European Search Report," for European Patent Application No. 20194410.5 mailed Jun. 30, 2021 (7 pages).

"Non-Final Office Action," for U.S. Appl. No. 17/466,438 mailed Mar. 21, 2023 (17 pages).

"Response to Communication Pursuant to Rules 70(2) and 70a(2)/Rule 39(1)," for European Patent Application No. 20194408.9 filed Sep. 9, 2022 (15 pages).

"Response to Communication Pursuant to Rules 70(2) and 70a(2)/Rule 39(1)," for European Patent Application No. 20194410.5 filed Sep. 9, 2022 (9 pages).

"Response to Communication Pursuant to Rules 70(2) and 70a(2)/Rule 39(1)," for European Patent Application No. 21194458.2 filed Sep. 9, 2022 (6 pages).

"Response to Communication Pursuant to Rules 70(2) and 70a(2)/Rule 39(1)," for European Patent Application No. 21194471.5 filed Sep. 9, 2022 (6 pages).

"Extended European Search Report," for European Patent Application No. 21194458.2 mailed Jan. 17, 2022 (8 pages).

"Extended European Search Report," for European Patent Application No. 21194471.5 mailed Jan. 17, 2022 (7 pages).

"Response to Non-Final Rejection," mailed on Mar. 21, 2023 for U.S. Appl. No. 17/466,438, submitted via EFS-Web on Jun. 21, 2023, 14 pages.

"Final Office Action," for U.S. Appl. No. 17/466,438 mailed Apr. 8, 2024 (18 pages).

"Final Office Action," for U.S. Appl. No. 17/466,438 mailed Dec. 19, 2023 (24 pages).

"Response to Final Rejection," mailed on Dec. 19, 2023, for U.S. Appl. No. 17/466,438, submitted via EFS-Web on Feb. 15, 2024, 10 pages.

"Response to Final Rejection," mailed on Apr. 4, 2024, for U.S. Appl. No. 17/466,438, submitted via EFS-Web on Jul. 8, 2024, 12 pages.

"Non-Final Office Action," for U.S. Appl. No. 17/466,438 mailed Feb. 26, 2025 (20 pages).

"Communication pursuant to Article 94(3)," for European Patent Application No. 20194408.9 mailed Aug. 8, 2025 (7 pages).

"Communication pursuant to Article 94(3)," for European Patent Application No. 21194458.2 mailed Aug. 7, 2025 (8 pages).

"Notice of Allowance," for U.S. Appl. No. 17/466,438 mailed Sep. 30, 2025 (12 pages).

* cited by examiner

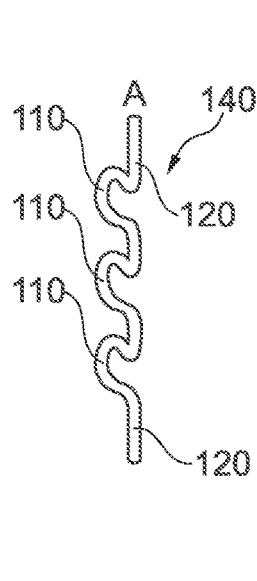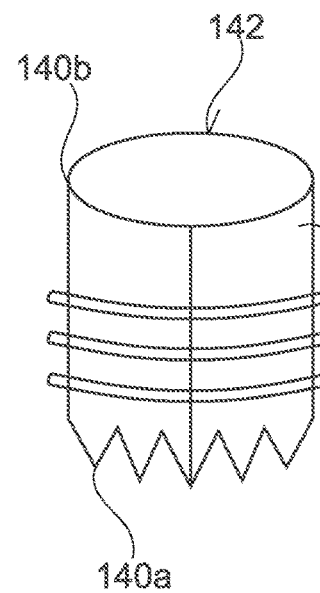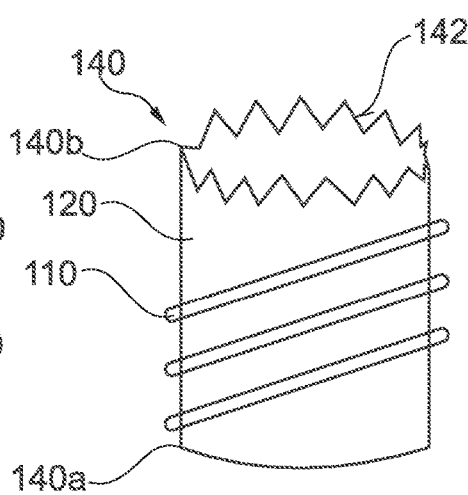
Fig. 4b  Fig. 4a  Fig. 5
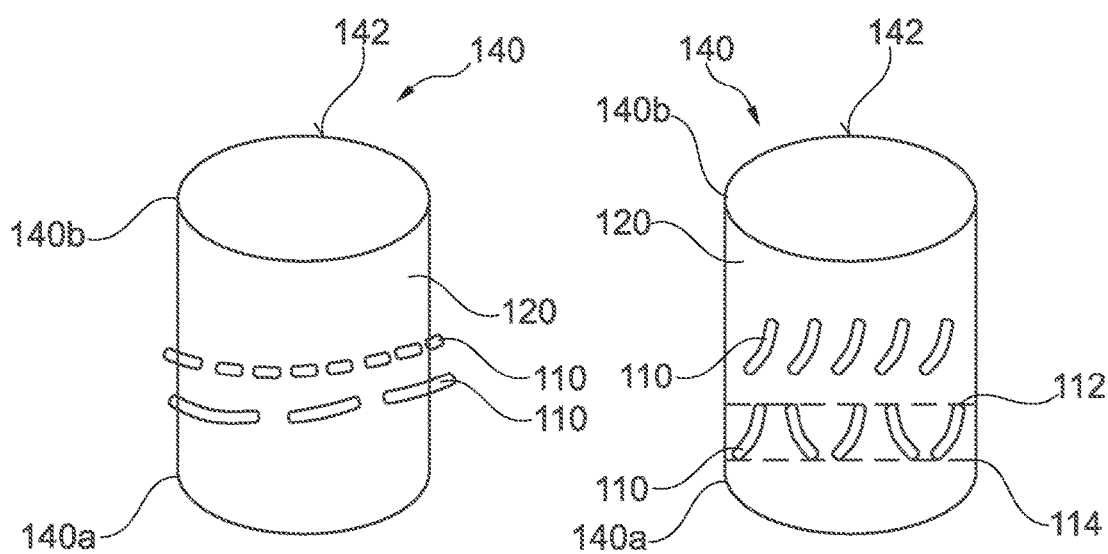
Fig. 6  Fig. 7 arranging a skirt material 210 on a first mold 220, 230 having a first surface contour 222, 232 with one or more protrusions 226 and/or one or more recesses 236,

↓ bringing the skirt material 210 into contact with the first surface contour 222, 232 such that a shape of the skirt material 210 follows the first surface contour 222, 232 of the first mold 220, 230, and forms one or more bulges 110 corresponding to the one or more protrusions 226 and/or one or more recesses 236,

↓ holding the skirt material 210 in contact

↓ fixing the skirt material 210 during holding

Fig. 11

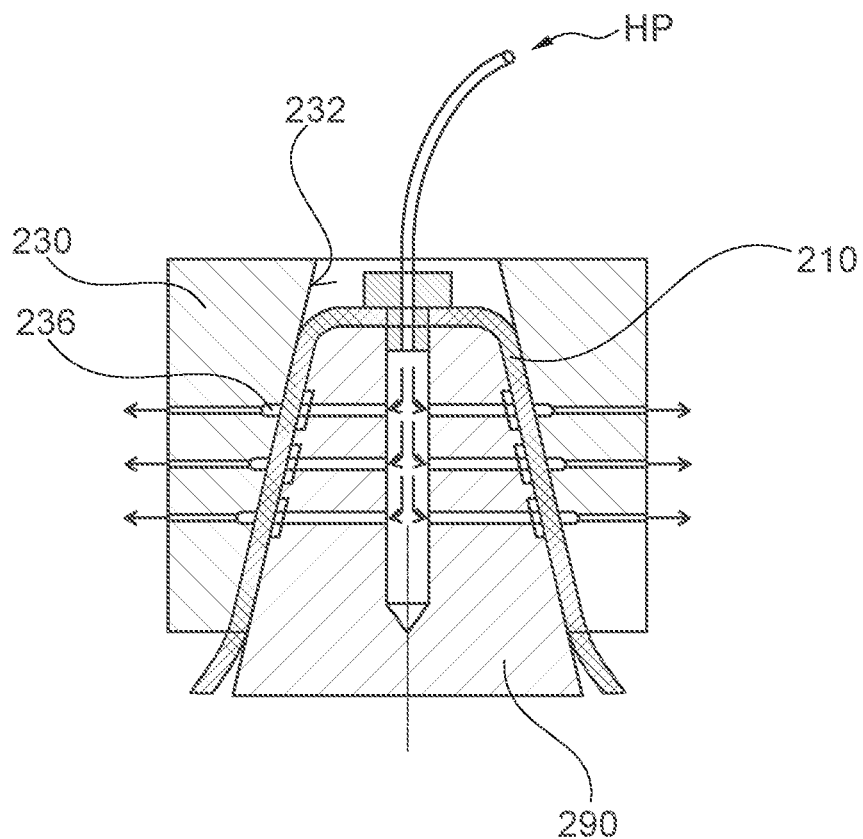
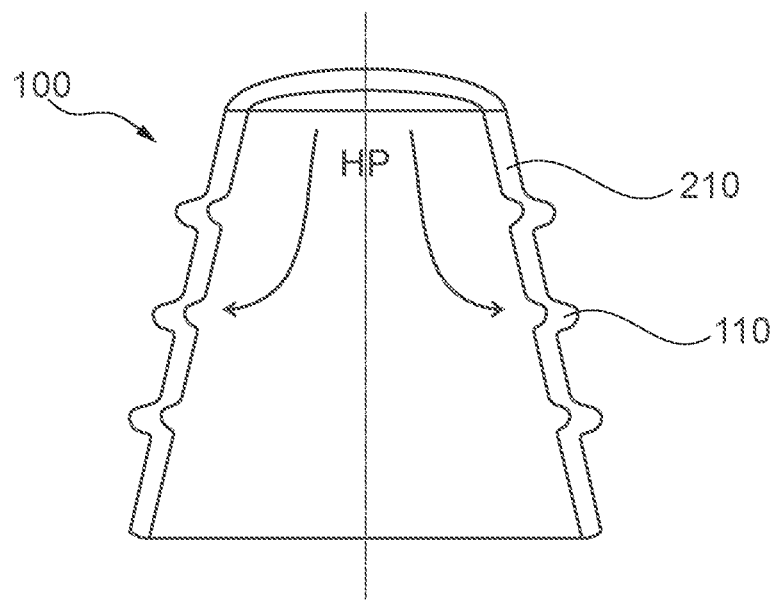
Fig. 16

REPLACEMENT HEART VALVE HAVING IMPROVED PREFORMED SEAL

CLAIM OF PRIORITY

This application claims the benefit of European Patent Application No. EP20194408.9, filed on Sep. 3, 2020, the disclosure of which is incorporated herein by reference.

TECHNICAL FIELD

The present disclosure relates to the field of transcatheter stent-valves. In some non-limiting aspects, the stent-valve may be a cardiac replacement valve, for example, an aortic or mitral replacement valve.

BACKGROUND

Transcatheter valve implantation (for example, transcatheter aortic valve implantation (TAVI)) is an evolving technology for replacement valve therapy that (i) avoids the trauma of conventional open-chest surgery, and (ii) avoids the need for heart and lung bypass. In such a technique, a stent-valve is compressed and loaded into a delivery catheter. The delivery catheter is introduced to the desired site of implantation (for example at the heart) via a percutaneous route or via minimally invasive surgery. The stent-valve is deployed into the implantation position from or by the delivery catheter, and the delivery catheter is then withdrawn.

Despite the successes of transcatheter stent-valves, technological challenges remain. One such challenge is reducing residual leakage of blood around the stent-valve (so called paravalvular leakage). The above stents form a friction fit with the native anatomy to anchor the stent-valve in position, and are generally round in cross-section. However the native anatomy in which the stent is implanted is often more irregular and varies from patient to patient. Moreover, heavy calcification of the native anatomy may obstruct full deployment of a stent, and make the native anatomy even more irregular. Thus, without taking further measures, it can be difficult to obtain sufficient sealing around the stent-valve.

In order to address paravalvular leakage, it is known to incorporate an outer skirt or cover as part of the stent-valve. Generally speaking, it can be expected that the thicker or more voluminous the material of the skirt, the better able the skirt is to occlude gaps and effect a seal. Thus, it would be desirable to provide a very voluminous outer skirt. However, a disadvantage is that such skirts add to the bulk of the stent-valve. A voluminous skirt makes the stent-valve problematic to compress to a desirably small cross-sectional size for delivery.

SUMMARY

In a first aspect, the present disclosure relates to a cardiac stent-valve for transcatheter delivery. The stent-valve may be compressible to a compressed state for delivery, and expandable to an expanded state for implantation. The stent-valve may comprise a stent, a plurality of leaflets and a sealing skirt. The stent may have an axial inflow end and an axial outflow end. The plurality of leaflets may be arranged within the stent. The sealing skirt may be configured for reduction or prevention of paravalvular leakage. In the expanded state, the sealing skirt may comprise a tubular inner wall and at least one pocket. The pocket may be positioned on the tubular inner wall. The pocket may comprise an outer wall which extends radially outward from the tubular inner wall. The pocket may be configured to be distended radially outward in response to inflow of blood in the expanded state. In the expanded state, the outer wall of the pocket may comprise one or more pre-shaped bulges which may extend radially outward from the outer wall of the pocket.

In some embodiments, the one or more pre-shaped bulges may be preformed in the outer wall of the pocket. It may be advantageous, if the one or more pre-shaped bulges are preformed in the outer wall of the pocket by imparting a pre-determined shape to the outer wall, followed by fixation of the pre-determined shape.

In some embodiments, the fixation may involve chemically or physically crosslinking a cross-linkable material in the outer wall of the pocket. Alternatively or additionally, the fixation may involve subjecting the pre-determined shape of the outer wall of the pocket to an annealing heat treatment.

In some embodiments, the one or more pre-shaped bulges may comprise a shape-memory material. Alternatively or additionally, the one or more pre-shaped bulges may be configured to assume a pre-determined shape in the expanded state.

In some embodiments, the outer wall and the one or more pre-shaped bulges for a unitary body.

In some embodiments, the outer wall of the pocket and the one or more pre-shaped bulges may comprise the same material. Alternatively or additionally, the outer wall of the pocket and the one or more pre-shaped bulges of the pocket may be made, for instance consist, of the same material.

In some embodiments, in the expanded state, the one or more pre-shaped bulges may be configured to be extendable radially outward independently of the pocket being able to distend radially outward.

In some embodiments, the outer wall may comprise a generally tubular portion. Additionally, the one or more pre-shaped bulges may be formed in the generally tubular portion.

In some embodiments, specifically in the expanded state, the generally tubular portion may be distensible radially outward. Additionally, the generally tubular portion may be distensible radially outward to form a first pocket section.

In some embodiments, specifically in the expanded state, each of the one or more pre-shaped bulges may be distensible radially outward. Additionally, each of the one or more pre-shaped bulges may be distensible radially outward to extend further radially outward from the generally tubular portion. Alternatively or additionally, each of the one or more pre-shaped bulges may be distensible further radially outward than the generally tubular portion. Alternatively or additionally, each of the one or more pre-shaped bulges may form a respective second pocket section.

In some embodiments, in the expanded state, the first pocket section may be configured to be formed independently from any of the second pocket sections. Alternatively or additionally, at least a portion of the first pocket section and/or at least a portion of any one of the second pocket sections may be formed in the expanded state.

In some embodiments, in the expanded state, the first pocket section may be configured to extend continuously or intermittently at least about an angle of about 180°, specifically at least about an angle of about 270°, more specifically at least about an angle of about 360° along a circumference of the outer wall. Alternatively or additionally, the first pocket section may be configured to form an annular pocket, specifically in the expanded state.

In some embodiments, the outer wall may be formed as a sheet and folded in a generally tubular form.

In some embodiments, the one or more pre-shaped bulges may be pre-formed in the outer wall in a predetermined pattern.

In some embodiments, specifically in the expanded state, at least one of the one or more pre-shaped bulges may be configured to extend radially outward continuously or intermittently at least about an angle of about 180°, specifically at least about an angle of about 270°, more specifically at least about an angle of about 360° along a circumference of the outer wall.

In some embodiments, specifically in the expanded state, at least one of the one or more pre-shaped bulges may be configured to be extendable radially outward along a circumference of the outer wall in a circumferential direction of the outer wall. Alternatively or additionally, specifically in the expanded state, at least one of the one or more pre-shaped bulges may be configured to be extendable radially outward continuously about an angle of about 360° of the circumference of the outer wall.

In some embodiments, specifically in the expanded state, at least one of the one or more pre-shaped bulges may be configured to extend radially outward along a circumference of the outer wall in a direction inclined with respect to a circumferential direction of the outer skirt.

In some embodiments, specifically in the expanded state, at least one of the one or more pre-shaped bulges may be configured to extend radially outward along a circumference of the outer wall in a meandering shape, for instance, a zig-zag-shape, a wave-shape or sinuous shape. In some embodiments, the stent may comprise a lattice structure of cells defined by interconnected struts. Additionally, the meandering shape of the at least one of the one or more pre-shaped bulges may generally follow a shape defined by respective underlying struts.

In some embodiments, the shape of at least one of the one or more pre-shaped bulges may be configured such that, specifically in the expanded state, at each axial level of the outer wall, the fraction of a circumference of the outer wall occupied the one or more pre-shaped bulges is less than about 100%, optionally less than about 90%, optionally less than about 80%, optionally less than about 70%.

In some embodiments, specifically in the expanded state, a thickness may vary in a circumferential direction and/or in an axial direction of the outer wall. Alternatively or additionally, specifically in the expanded state, a depth of at least one of the one or more pre-shaped bulges may vary in a circumferential direction and/or in an axial direction of the outer wall.

In some embodiments, specifically in the expanded state, the outer wall may comprise a plurality of pre-shaped bulges which are axially and/or circumferentially distanced from each other. For instance, the outer wall may comprise two, three, four, five or more pre-shaped bulges which are axially distanced from each other.

In some embodiments, specifically at least in the expanded state, the pocket may have an opening facing in the antegrade direction towards the axial outflow end. In some embodiments, the opening may have an annular shape formed between the inner tubular wall and the outer wall.

In some embodiments, the outer wall of the pocket may have a first axial end. The first axial end may be arranged towards the axial inflow end. In some embodiments, the outer wall may have a second axial end. The second axial end may be arranged towards the axial outflow end. In some embodiments, the outer wall may be attached to the stent via an attachment portion at the first axial end. A bottom of the pocket may be formed by the outer wall conjointly with the inner tubular wall. Alternatively or additionally, the outer wall may be attached to the inner tubular wall via an attachment portion at the first axial end. A bottom of the pocket may be formed by the outer wall conjointly with the inner tubular wall. In some embodiments, the attachment portion is arranged at an axial position of the stent between the axial inflow end and an upper crown of the stent.

In some embodiments, the outer wall of the pocket may have a free circumferential edge at the second axial end being directed to the axial outflow end. Additionally, specifically at least in the expanded state, an opening of the pocket may be formed by the free circumferential edge conjointly with the inner wall. In some embodiments, the free circumferential edge may be arranged at an axial position of the stent between the axial inflow end and an upper crown of the stent. In some embodiments, the free circumferential edge may be arranged at an axial position of the stent between the attachment portion and an upper crown of the stent. In some embodiments, at least in the expanded state, the free circumferential edge may have a substantially straight edge. Alternatively, at least in the expanded state, the free circumferential edge may have a non-straight edge, for instance, an undulating shape, or castellated shape, or notched shape. In some embodiments, the non-straight edge aligns with apexes of an upper crown of the stent.

In some embodiments, the outer wall may be a generally tubular wall such that, at least in the expanded state, the pocket is configured to assume the shape of an annular pocket formed between the inner tubular wall and the outer wall.

In some embodiments, the sealing skirt may be attached to the stent on an interior of the stent. The sealing skirt may be everted around the axial inflow end such that a portion of the sealing skirt being on the interior of the stent may form the inner tubular wall. A portion of the sealing skirt being everted and extending towards the axial outflow end may form the outer wall.

In some embodiments, the inner wall may be an inner skirt. The inner skirt may be arranged, specifically may be attached to the stent, on an interior of the stent. Alternatively, the inner skirt may be arranged, specifically may be attached to the stent, on an exterior of the stent. In some embodiments, the outer wall may be at least a portion of an outer skirt. The outer wall, specifically the outer skirt, may be arranged and/or extend radially outside of the inner wall, specifically radially outside of the inner skirt. Alternatively or additionally, the outer wall, specifically the outer skirt, may be arranged and/or extend on the exterior of the stent. In some embodiments, the outer skirt may have a first outer skirt end. The first outer skirt end may be arranged towards the axial inflow end. In some embodiments, the outer skirt may have a second outer skirt end. The second outer skirt end may be arranged towards the axial outflow end.

In some embodiments, the first outer skirt end may be arranged at the axial inflow end. In some embodiments, the outer wall may be a first outer skirt portion of the outer skirt. The outer wall, specifically the first outer skirt portion, may extend from the second outer skirt end to an attachment portion. In some embodiments, the first outer skirt portion may be free to deploy relative to the stent between the second outer skirt end and an attachment portion. Alternatively or additionally, the outer skirt may be attached to the stent and/or the inner skirt via the attachment portion to form a bottom of the pocket conjointly with the inner skirt.

In some embodiments, the outer skirt may comprise a second outer skirt portion. The second outer skirt portion may extend from the attachment portion to the first outer skirt end. In some embodiments, the second outer skirt portion may be attached to the stent. In some embodiments, the second outer skirt portion may be attached to the stent between the attachment portion and the first outer skirt end. In some embodiments, the second outer skirt portion may cover open cells of a lattice structure of the stent between the attachment portion and the axial inflow end.

In some embodiments, the inner tubular wall may be formed by a tubular inflow section of a valve component. In some embodiments, the outer wall may be formed by a tubular inflow section of a valve component. In some embodiments, the tubular inflow section of the valve component may extend to the axial inflow end. Alternatively or additionally, the tubular inflow section may be everted around the axial inflow end. Alternatively or additionally, a portion of the tubular inflow section being on the interior of the stent may form the inner tubular wall. Alternatively or additionally, a portion of the tubular inflow section being everted and extending towards the axial outflow end may form the outer wall. In some embodiments, specifically in the expanded state, the valve component may axially extend from a valve inflow end to a valve outflow end. The outer wall may be attached to the stent and/or the inner wall via an attachment portion to form a bottom of the pocket conjointly with the valve component. The attachment portion may be arranged at an axial height of the valve inflow end.

In some embodiments, specifically at least in the expanded state, a free circumferential edge of the outer wall may be arranged at an axial height between the valve inflow end and the valve outflow end.

In some embodiments, specifically at least in the expanded state, a free circumferential edge of the outer wall may be arranged at an axial height of an upper crown of the stent. Alternatively or additionally, specifically at least in the expanded state, the upper crown may be configured to bias the free circumferential edge radially outward.

In some embodiments, specifically in the expanded state, the leaflets may axially extend from a valve inflow end to a valve outflow end. In some embodiments, the inner tubular wall may overlap with an axial position of the valve inflow end. Alternatively or additionally, the leaflets may be directly or indirectly attached to the inner tubular wall at an axial position of the valve inflow end. In some embodiments, specifically at least in the expanded state, the pocket may extend between the valve inflow end and the valve outflow end. Alternatively, at least a portion of the pocket may extend between the valve inflow end and the valve outflow end. In some embodiments, specifically at least in the expanded state, at least a portion of the outer wall may extend between the valve inflow end and the valve outflow end. In some embodiments, specifically at least in the expanded state, a free circumferential edge of the outer wall may be arranged at an axial height between the valve inflow end and the valve outflow end. In some embodiments, specifically at least in the expanded state, at least one of the one or more pre-shaped bulges may be arranged at an axial height between the valve inflow end and the valve outflow end.

In some embodiments, specifically at least in the expanded state, the outer wall may be attached to the stent and/or the inner tubular wall via an attachment portion at a first axial end of the outer wall to form a bottom of the pocket conjointly with the inner tubular wall. In some embodiments, specifically at least in the expanded state, the attachment portion may be arranged at an axial height between the valve inflow end and the valve outflow end. In some embodiments, specifically at least in the expanded state, the attachment portion may be arranged at an axial height between the valve inflow end and the axial inflow end.

In some embodiments, one or more control attachments may be formed between the outer wall and the stent. Alternatively or additionally, one or more control attachments may be formed between the outer wall and the inner tubular wall. In some embodiments, the one or more control attachments may be configured to permit the outer wall to distend substantially freely, while preventing everting of the outer wall. In some embodiments, at least one of the one or more control attachments may be arranged at a free circumferential edge of the outer wall. Alternatively or additionally, at least one of the one or more control attachments may be arranged adjacent, specifically directly adjacent, to a free circumferential edge of the outer wall. The at least one of the one or more control attachments may be arranged axially adjacent towards the axial inflow end. In some embodiments, at least one of the one or more control attachments may be arranged at an axial height between a first axial end of the outer wall and a second axial end of the outer wall. In some embodiments, a plurality of control attachments may be provided. Alternatively or additionally, the plurality of control attachments may be distributed circumferentially. Alternatively or additionally, the control attachments may be distributed equally or unequally spaced. Alternatively or additionally, some or all of the control attachments may be arranged at different axial heights.

In some embodiments, specifically in the expanded state, the one or more pre-shaped bulges may be configured to extend radially outward independently of a foreshortening of the stent during expansion. In some embodiments, an axial length of the outer wall may be substantially about the same in the compressed state and in the expanded state. In some embodiments, the axial length of the outer wall may shorten less than about 30%, specifically less than about 15% and more specifically less than about 5% from the compressed state to the expanded state.

In some embodiments, the stent may comprise at least one of: a lower tubular portion, an upper crown portion, a plurality of upstanding commissural supports, and/or a plurality of stabilization arches. In some embodiments, the stent may comprise the lower tubular portion. In some embodiments, the stent may comprise the lower tubular portion, the upper crown portion, a plurality of upstanding commissural supports, and the plurality of stabilization arches. In some embodiments, the lower tubular portion may communicate with the upper crown and the commissural supports. Alternatively or additionally, the commissural supports may upstand relative to the upper crown portion. Alternatively or additionally, the stabilization arches may communicate with the commissural supports. In some embodiments, specifically at least in the expanded state, the one or more pre-shaped bulges may be positioned between and spaced from respective extremities of both a free edge of the upper crown portion, and a free edge of the lower tubular portion. In some embodiments, specifically at least in the expanded state, at least one of the one or more pre-shaped bulges may be arranged at an axial height of the lower tubular portion. Alternatively or additionally, at least one of the one or more pre-shaped bulges may be arranged at an axial height of an extremity of the lower tubular portion the furthest away from the axial inflow end.

In some embodiments, the outer wall and/or the inner tubular wall may be formed of material selected from: biological tissue, for instance pericardial tissue, metal, for instance metal foil, synthetic material and combinations thereof. In some embodiments, the synthetic material may be selected from: fabric; hydrogel; foam; sponge; porous fibrous material. In some embodiments, the outer wall and/or the inner tubular wall may be formed of material selected from: biologic materials, polymeric materials, fabric materials, permeable materials, impermeable materials, materials that promote tissue ingrowth, materials that retard tissue ingrowth, foam materials, sealing materials, and combinations thereof. In some embodiments, the one or more pre-shaped bulges may be formed of the same or of a different material than generally tubular portion.

In a second aspect, the present disclosure relates to a method for fabricating a sealing skirt of a cardiac stent-valve. The method may comprise arranging a skirt material on a first mold. The first mold may have a first surface contour with one or more protrusions and/or one or more recesses. The method may further comprise bringing the skirt material into contact with the first surface contour such that a shape of the skirt material follows the first surface contour of the first mold, and forms one or more bulges corresponding to the one or more protrusions and/or one or more recesses. The method may further, specifically subsequently, comprise holding the skirt material in contact. The method may further comprise fixing the skirt material during holding.

In some embodiments, fixing may comprise chemically or physically crosslinking a crosslinkable material in the skirt material. Alternatively or additionally, fixing may comprise heat treating to anneal the skirt material.

In some embodiments, it may be advantageous that holding is performed for at least about 12 hours, specifically for at least about 18 hours, and more specifically for at least about 24 hours. It may be further advantageous if fixing is performed for at least about 12 hours, specifically for at least about 18 hours, and more specifically for at least about 24 hours. In some embodiments, it may be particularly useful to perform chemically or physically crosslinking for at least about 12 hours, specifically for at least about 18 hours, and more specifically for at least about 24 hours. In some embodiments, it may be particularly useful to perform heat treating for at least about 12 hours, specifically for at least about 18 hours, and more specifically for at least about 24 hours.

In some embodiments, it may be advantageous that bringing the skirt material into contact with the first surface contour comprises pressing the skirt material into contact with the first surface contour by an external force. In some embodiments, pressing the skirt material into contact with the first surface contour by an external force may comprise deforming the skirt material.

In some embodiments, the external force is brought up by pressing a second mold against the first mold. In some embodiments, it may be particularly useful that the second mold has a second surface contour shaped as a negative to the first surface contour of the first mold. In some embodiments, the first mold may be a male mold. Additionally, the first mold may have one or more protrusions. Alternatively or additionally, the second mold may be a female mold. Additionally, the second mold may have one or more recesses.

In some embodiments, the skirt material may be crosslinked and/or heat treated while being in the shape of a sheet. Subsequently, it may be advantageous that fixing comprises bringing the skirt material in a cylindrical shape and then connecting two respective side edges of the skirt material to form the sealing skirt. In some embodiments, the first and second molds may be flat molds. Alternatively or additionally, the skirt material may be a sheet material which is pressed between the first and second molds by a tightening device. The tightening device may press the first and second molds together. In some embodiments, at least one of the one or more protrusions and/or at least one of the one or more recesses may extend from a first side edge to a second side edge of the first and second molds, respectively, such that at least one bulge may be formed which extends from a first side edge to a second side edge of the skirt material. In some embodiments, after crosslinking and/or heat treating, the skirt material may be released from the molds. Additionally, specifically subsequently, the skirt material may be brought in a cylindrical shape. Additionally, specifically subsequently, the skirt material may be connected at the side edges to form the sealing skirt. In some embodiments, the skirt material may be brought in the cylindrical shape by arranging it on a cylindrical holding mold. In some embodiments, the side edges of the skirt material may be connected by suturing, adhesively attaching or joining.

In some embodiments, the first mold may be a cylindrical holding mold. In some embodiments, it may be advantageous that the first surface contour extends on an outer shell surface of the first mold. In some embodiments, the skirt material may be a sheet material which is pulled over the first mold to cover the outer shell surface. In some embodiments, the skirt material may be pulled over the first mold by an outer holding mold. Alternatively or additionally, it may be further advantageous that the skirt material is held in a position covering the outer shell surface by an outer holding mold. In some embodiments, the outer holding mold may be ring shaped. In some embodiments, the outer holding mold may be made from a soft material, specifically from silicone.

In some embodiments, the second mold may be shaped as hollow cylinder. The second mold may be pressed circumferentially around the first mold. Additionally, second mold may be pressed circumferentially around the first mold by a tightening device. Pressing the second mold circumferentially around the first mold may be performed after pulling the skirt material over the first mold. In some embodiments, the second mold may comprise two halves of a hollow cylinder. The two halves may be pressed together by the tightening device. In some embodiments, the tightening device may comprise a band clip which is attached around an exterior of the second mold and which urges the second mold radially inwardly. Alternatively or additionally, screws may be used to press the two halves together.

In some embodiments, after pressing the second mold around the first mold, the skirt material may be held in contact at an upper portion and/or at a lower portion of the first mold.

In some embodiments, it may be advantageous, to remove, specifically cut off an excess portion of the skirt material extending freely below the first mold, before crosslinking and/or heat treating, In some embodiments, at least one of the one or more protrusions and/or at least one of the one or more recesses may extend circumferentially along the first and second molds, respectively, such that at least one bulge may be formed in the skirt material which is ring shaped and bulges radially outward.

In some embodiments, the external force may be brought up by arranging clamping elements on an exterior of the skirt material. In some embodiments, the first mold may be a cylindrical holding mold. In some embodiments, it may be advantageous that the first surface contour extends on an outer shell surface of the first mold. Alternatively or additionally, the skirt material may be a sheet material. The sheet material may be pulled over the first mold to cover the outer shell surface. In some embodiments, the skirt material may be pulled over the first mold by an outer holding mold. Alternatively or additionally, it may be further advantageous that the skirt material is held in a position covering the outer shell surface by an outer holding mold. In some embodiments, the outer holding mold may be ring shaped. In some embodiments, the outer holding mold is made from a soft material, specifically from silicone.

In some embodiments, the first mold may be a male mold. Alternatively or additionally, at least one of the one or more protrusions may extend circumferentially along the first mold such that at least one bulge is formed in the skirt material which is ring shaped and which bulges radially outward. In some embodiments, it may be advantageous that after pulling the skirt material over the first mold, the external force is brought up by arranging clamping elements on an exterior of the skirt material. It may be further advantageous that two clamping elements are arranged directly axially adjacent of a respective bulge on both sides. In some embodiments, the clamping elements compressive rings. Alternatively or additionally, arranging clamping elements on an exterior of the skirt material may comprise wrapping strings directly axially adjacent of a respective bulge on both sides around the circumference of the skirt material. The strings may be wrapped such that the skirt material is radially compressed or pressed radially inwardly directly axially adjacent of a respective bulge on both sides. In some embodiments, after arranging the clamping elements, the skirt material may be held in contact at an upper portion and at a lower portion of the first mold. In some embodiments, it may be advantageous, to remove, specifically cut off an excess portion of the skirt material extending freely below the first mold, before crosslinking and/or heat treating.

In some embodiments, the external force may be brought up by applying fluid pressure to an interior of the skirt material. In some embodiments, the skirt material may be tightly pulled over a conical holding mold. Then the conical holding mold may be inserted into a correspondingly frustoconically formed hole of the first mold to bring the skirt material into contact with the first surface contour of the first mold. Alternatively or additionally, the skirt material may be pressed radially outward into one or more recesses arranged in the first surface contour by fluid pressure to form one or more bulges. In some embodiments, it may be advantageous to maintain the fluid pressure during crosslinking and/or heat treating.

In some embodiments, the skirt material may be a sheet material having a first surface and a second surface. Alternatively or additionally, the first surface may be a smooth surface. Alternatively or additionally, the second surface may be a fibrous surface. In some embodiments, it may advantageous that the second surface of the skirt material is brought into contact with the first surface contour.

In some embodiments, the skirt material may be formed of a crosslinkable polymer, for instance polyurethane (PU). In some embodiments, the skirt material may be formed of a biological material, for instance pericardial tissue, specifically bovine pericardial tissue, porcine pericardial tissue or ovine pericardial tissue.

In some embodiments, the first mold may be made from a material selected from: silicone, polyoxymethylene (POM), or any other suitable material. In some embodiments, the second mold may be made from a material selected from: silicone, polyoxymethylene (POM), or any other suitable material.

In a third aspect, the present disclosure relates to relates to a cardiac stent-valve (10) for transcatheter delivery. The stent-valve (10) may be compressible to a compressed state for delivery and expandable to an expanded state for implantation. The stent-valve (10) may comprise a stent (20) with an axial inflow end (20a) and an axial outflow end (20b) and a plurality of leaflets (14) arranged within the stent (20). The stent-valve (10) may comprise a sealing skirt (100) for reduction or prevention of paravalvular leakage. The sealing skirt (100) may comprise, in the expanded state, one or more bulges (110) which are extending radially outward from the sealing skirt (100). The one or more bulges (110) may be pre-formed in the sealing skirt (100).

In some embodiments, it may be advantageous that the cardiac stent-valve (10) is further characterized by any of the features of the first and second aspect of the present disclosure.

Additional details and features of the disclosure are described with reference to the drawings as follows.

DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

FIGS. 4a to 7 are schematic drawings illustrating different shapes of bulges 110 on an outer wall of a sealing skirt 100;

FIG. 9a is a schematic drawing illustrating a cross-section of a sealing skirt 100 and a stent 20 in a side cut view similar to the illustration of FIG. 1a;

FIG. 11 shows method steps of a method for fabricating a sealing skirt 100;

FIG. 16 is a schematic drawing illustrating various aspects of the method using fluid pressure.

DETAILED DESCRIPTION

Figure 1A:
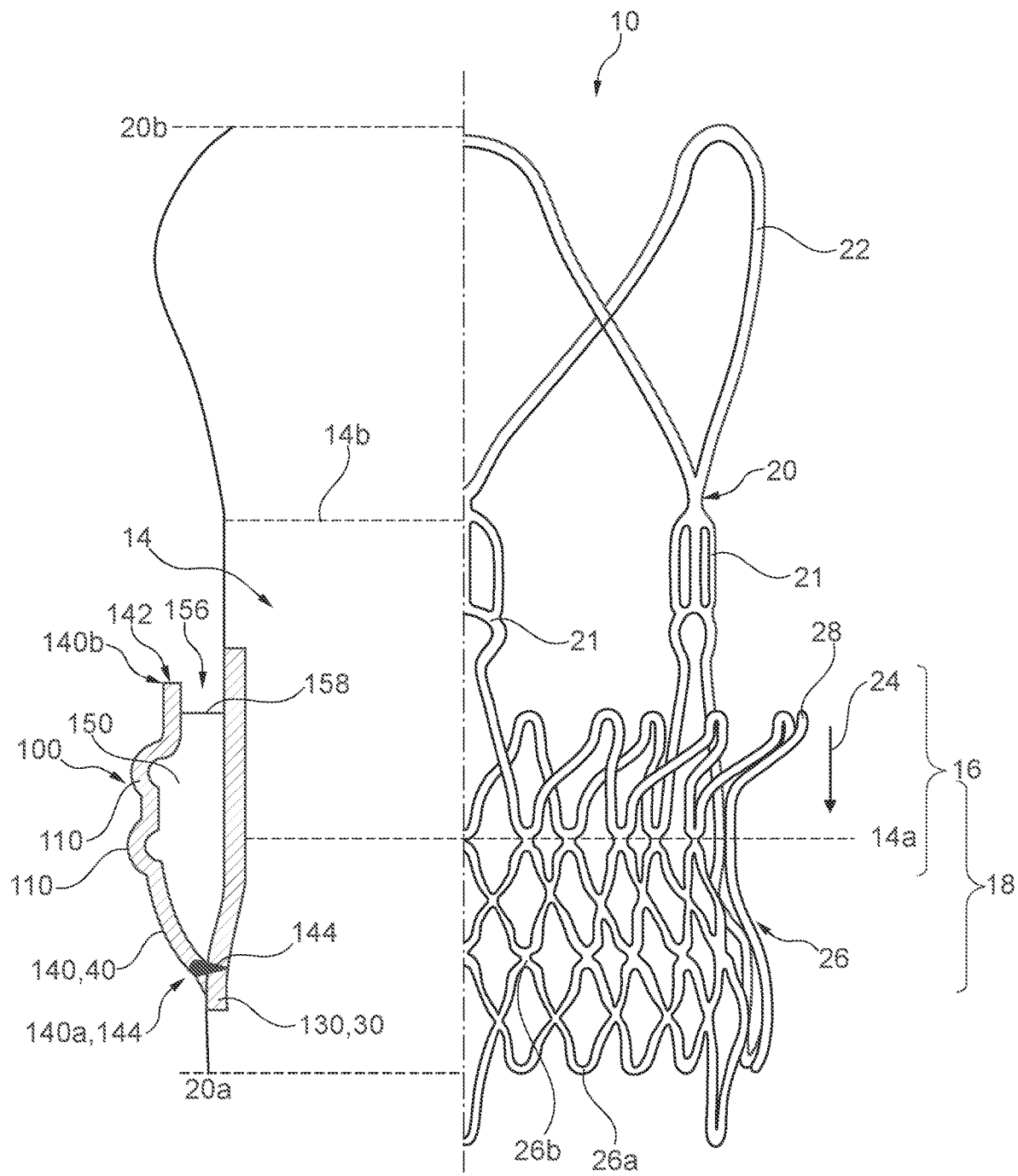
FIG. 1a is a schematic drawing illustrating a stent-valve 10 with a sealing skirt 100 comprising two bulges 110 in a split view showing a side cut and a front view.

Hereinafter, a detailed description of the present disclosure will be given. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

Referring to the drawings, a stent-valve 10 is illustrated for transcatheter implantation. The stent-valve 10 may be a cardiac stent-valve, for example, an aortic stent-valve, a mitral stent-valve, a pulmonary stent-valve or a tricuspid stent-valve, for implantation at the respective valve position in a human heart. The stent-valve 10 may generally comprise at least a stent 20, a plurality of valve leaflets 14 supported by the stent, and a skirt, for example, a sealing skirt 100. The sealing skirt 100 may be configured for preventing or reducing paravalvular leakage. In other words, the sealing skirt 100 may be configured for obstructing paravalvular leakage. More detail is now described about exemplary stent-valves 10 for which the sealing skirts 100 of the present disclosure are especially suitable, although it will be appreciated that this detail is non-limiting on the scope of the present disclosure, and that the sealing skirts 100 disclosed herein may be used on many different types and shapes of stent-valves.

The stent-valve 10 may optionally comprise leaflets comprising biological tissue (for example, pericardium (such as porcine pericardium and/or bovine pericardium) and/or natural cardiac valve leaflets (for example, natural porcine cardiac valve leaflets, optionally attached to a portion of natural cardiac wall tissue). The biological tissue may be fixed, for example, using glutaraldehyde. The biological tissue may have anti-calcification properties, for example, having been treated or processed to inhibit or slow calcification (for example, by treatment in alcohol or a detergent solution). The biological tissue may be stored in a liquid storage solution, or it may be stored in a substantially dehydrated form. The stent-valve 10 may also comprise synthetic material (e.g. fabric or electrospun polymer) for the leaflets and/or one or more skirts.

The stent-valve 10 may be compressible to a radially compressed state (not shown) for delivery using a delivery catheter, and be expandable to or towards an expanded state (as shown in FIG. 1a) at implantation. In the context of this disclosure an "expanded state" may be a nominally expanded state, which represents a maximally extended state in air. Furthermore, a deployed state (e.g. deployed at an implantation site) may be a state in between the compressed state and the (nominally) expanded state. For instance, a deployed state may be an expansion of about 50% to about 100%, specifically about 70% to about 100% and more specifically about 90% to about 100% of an expansion in the (nominally) expanded state. During transition from the compressed state (e.g. radially compressed state) to or towards the expanded state (e.g. radially expanded state), a tubular region of the stent 20 may increase in diameter and/or may decrease in axial length.

Various geometries of stent 20 may be used. In some embodiments, the stent 20 may include one of more of: a first tubular portion (also referred to as first/lower (crown) portion, first/lower crown) 26; a second crown portion (also referred to as upper crown portion, second/upper crown) 28; a plurality of upstanding commissural supports 21; and a plurality of stabilization arches 22. Depending on the intended use, the first portion 26 of the stent 20 may be configured to be deployed after the other regions of the stent 20 have first been at least partly deployed. For example, the arches 22, the supports 21 and the second crown 28 may be deployed at least partly before the first portion 26 (in that order, or in reverse order, or in a different order). At least once the second crown 28 has been at least partly deployed, the stent 20 may be urged and/or displaced in the direction of arrow 24 to seat the second crown 28 against native leaflets and/or the native annulus at the implantation site. Subsequently deploying the first portion 26 fixes the stent 20 in its final position.

In some embodiments, at least the first portion 26, and optionally a portion of the second crown 28, may be formed by a lattice structure of the stent. The lattice structure may define apertures (also referred to as cells), for example, generally diamond-shaped apertures or cells. The lattice structure may be formed by interconnected struts.

The native leaflets may generally overlap a portion 16 of the stent. The native valve annulus and/or inflow tract may overlap a portion 18 of the stent.

Optionally, the stent-valve 10 may further comprise an inner skirt 30 communicating with the leaflets 14 and carried on an interior of the stent 20. Additionally or alternatively, the stent-valve 10 may further comprise an outer skirt 40 carried on an exterior of the stent 20. When both skirts are provided, the skirts may partially overlap. The skirts may be offset such that one skirt (e.g. the outer skirt 40) extends further towards a lower extremity of the stent 20 than the other (e.g. inner skirt 30). Additionally or alternatively, one skirt (e.g. the inner skirt 30) extends further towards an upper extremity of the stent 20 than the other (e.g. outer skirt 40). The skirts may be of any suitable flexible and/or compliant material, for example, synthetic material (e.g. of polyesters such as polyethylene terephthalate (PET)), or polyethers (e.g. polyetheretherketone (PEEK)), or of biological tissue (e.g. of pericardial tissue, such as porcine or bovine pericardial tissue). Synthetic material may be used in any suitable form, for example, as a fabric (e.g. woven, non-woven, or knitted), or as a film, or a fabric/film composite.

Optionally, at least the outer skirt 40 may be positioned to leave (e.g. at least a portion of) the upper crown 28 substantially unobscured by the outer skirt 40. Such an arrangement may assist good blood flow to the coronary arteries (for example, in the case of a stent-valve for the aortic valve).

In some embodiments, the first portion 26 has an extremity formed with a substantially zig-zag shape. The zig-zag shape may comprise lower stent apexes 26a and upper stent apexes 26b. The upper stent apexes 26b may be masked in FIG. 1a by the superimposed presentation of both the frontmost and rearmost cells of the lattice structure. The zig-zag shape may be substantially continuous around the circumference of the stent 20. The outer skirt 40 may have at least one edge having a zig-zag shape that matches substantially the zig-zag shape of the extremity of the first portion 26. For example, the edge of the skirt may be an edge closest to the extremity of the first portion, and/or an edge remote from the extremity of the first portion. Such an arrangement can avoid excessive material at the extremity, and thereby facilitate crimping of the stent-valve 10. At the same time, the outer skirt 40 may cover (for example, completely) open cells of the lattice structure to the stent extremity to reduce risk of blood leakage through the apertures of the cells. The outer skirt 40 may also provide a layer of material over the struts of the stent, thereby to cushion the engagement between the stent and the sensitive native heart tissue.

The valve component (or, for brevity, only valve) 14 may comprise biological tissue, for example pericardial tissue (such as porcine pericardial tissue or bovine pericardial tissue), or natural cardiac valve leaflets (for example, natural porcine cardiac valve leaflets, optionally attached to a portion of natural cardiac wall tissue). Other biological or non-biological material could also be used for the valve 14, as desired. In some embodiments, it may be advantageous that the valve 14 comprises two, three or four valve leaflets 14.

The stent 20 may optionally be of a self-expanding type that is compressible to the compressed state for loading into a delivery catheter having a sheath for constraining the stent 20 in the compressed state for delivery to the site of implantation. In use, by removal of the constraining effect of the sheath, the stent 20 self-expands to or (e.g. at least partly) towards the expanded state. A self-expanding stent may, for example, be of shape-memory material, for example, shape-memory metal alloy, for example, nitinol. Additionally or alternatively, the stent 20 may be configured to be expanded by application of an expanding force from the delivery catheter, such as by using an expansion balloon or a pull wire or rotatable screw-like element for actively expanding the stent 20.

In the following, more detail is now described about the stent-valve 10 including the sealing skirts 100 of the present disclosure.

In a first aspect, the present disclosure relates to a cardiac stent-valve 10 for transcatheter delivery (see FIG. 1a). As explained above, the stent-valve 10 may be compressible to a compressed state for delivery, and expandable to an expanded state for implantation. The stent-valve 10 comprises a stent 20, a plurality of leaflets 14 and a sealing skirt 100. The stent 20 may have an axial inflow end 20a and an axial outflow end 20b. The plurality of leaflets 14 may be arranged within the stent 20. The sealing skirt 100 may be configured for reduction or prevention of paravalvular leakage. In the expanded state as shown, for instance in FIG. 1a, the sealing skirt 100 may comprise a tubular inner wall 130 and at least one pocket 150. The pocket 150 may be positioned on the tubular inner wall 130. The pocket 150 may comprise an outer wall 140 which extends radially outward from the tubular inner wall 130. It should be understood that the term "inner wall" refers to the relationship of the inner wall 130 to the outer wall 140 of the at least one pocket 150 and not to a relationship of the tubular inner wall 130 to the stent. In other words, the outer wall 140 is arranged radially outside from the tubular inner wall 130. That said, the tubular inner wall 130 may be arranged partly or completely radially outside or inside the stent 20. In some embodiments, the pocket 150 may be arranged directly on the tubular inner wall 130. However, in some other embodiments, the pocket 150 may be arranged indirectly on the tubular inner wall 130, e.g. by having the stent 20 or portions of the stent 20 arranged between the tubular inner wall 130 and the pocket 150.

The at least one pocket 150 (for brevity, the pocket 150) is configured to be distended radially outward in response to inflow of blood in the expanded state. Such inflow of blood may be inflow caused by retrograde blood flow and/or inflow caused by local blood pressure which causes the plurality of valve leaflets 14 to close. In some embodiments, in the deployed state, the pocket 150 may be configured such that blood may inflow into the pocket 150 in a retrograde direction. In other words, in the deployed state, the pocket 150 may be configured such that blood may inflow into the pocket 150 in a direction from the axial outflow end 20b towards the axial inflow end 20a. This may be realized, for instance, by providing the outer wall 140 of pocket 150 with slack in the deployed state such that the volume of the pocket 150 may increase when filled with a liquid such as blood. In some embodiments, in the expanded state, the outer wall 140 may be free to expand radially outward relative to the stent 20 and/or relative to the inner tubular wall 130.

In the expanded state, the outer wall 140 of the pocket 150 may comprise one or more pre-shaped bulges 110 which may extend radially outward from the outer wall 140 of the pocket 150. Therefore, FIG. 1a exemplarily shows two bulges 110 extending radially outward from the outer wall 140. However, it should be understood that the number of bulges 110 is not particularly limited.

Where reference to "pre-shaped" bulges 110 is made, it should be understood that the term "pre-shaped" may be meant to exclude bulges which are coincidentally or arbitrarily formed during transition from the compressed to the expanded state and/or bulges which are only formed by an additional biasing element/mechanism. It should be further understood that the term "pre-shaped" may additionally or alternatively refer to bulges 110 which are inherently integrated into the outer wall 140, for instance, by modeling the material of the outer wall 140 to a predetermined shape during manufacture. Finally, it should also be understood that the term "pre-shaped" may additionally or alternatively refer to bulges 110 which are not adhesively attached or welded or attached by stitching to the outer wall 140.

Without wishing to be bound by theory, the bulges 110 and the pocket 150 may cooperatively contribute to the paravalvular sealing as follows: The larger irregularities of a native annulus and/or native leaflets can be sealed by the pocket 150 whilst smaller remaining irregularities of the native annulus and/or the native leaflets may be sealed by bulges 110 which may extend radially further outward into the native tissue.

In some embodiments, the one or more pre-shaped bulges 110 may be preformed in the outer wall 140 of the pocket 150. In some embodiments, the one or more pre-shaped bulges 110 may be preformed in the outer wall 140 by a process involving tanning, curing, or any other means of crosslinking the material of the outer wall 140; by heat-treatment or fixing the imparted shape by other means such as stiches, welding or adhesively fixing the shape.

In some embodiments, it may be advantageous that the one or more pre-shaped bulges 110 are preformed in the outer wall 140 of the pocket 150 by imparting a predetermined shape to the outer wall 140, followed by fixation of the pre-determined shape. In some embodiments, fixation may comprise one or more of suturing, adhesively attaching (for instance gluing) and joining (for instance welding). Providing pre-shaped bulges 110, in particular in such a manner, may be a simple and cost-effective way to provide bulges 110 in the outer wall 140 of the pocket 150. In some embodiments, the fixation may involve chemically or physically crosslinking a cross-linkable material in the outer wall 140 of the pocket 150. At least a portion of the outer wall 140 may comprise or consist of the cross-linkable material. Alternatively, the outer wall 140 may consist of the cross-linkable material. Alternatively or additionally, the outer wall 140 may comprise or consist essentially of pericardium or a cross-linkable biocompatible polymer. Alternatively or additionally, the fixation may involve subjecting the pre-determined shape of the outer wall 140 of the pocket 150 to an annealing heat treatment. In some embodiments, the one or more pre-shaped bulges 110 may be preformed or pre-shaped in the outer wall 140 by chemically or physically crosslinking a cross-linkable material in the outer wall 140. Alternatively or additionally, the one or more pre-shaped bulges 110 may be preformed or pre-shaped in the outer wall 140 by subjecting the outer wall 140 to an annealing heat treatment. Alternatively or additionally, the one or more pre-shaped bulges 110 may be preformed or pre-shaped in the outer wall 140 by tanning.

In some embodiments, the one or more pre-shaped bulges 110 may comprise or may consist of a shape-memory material. Alternatively or additionally, the one or more pre-shaped bulges 110 may be configured to assume a pre-determined shape in the expanded state. It should be understood that the term "pre-determined shape" may be meant to exclude a shape that may be assumed by chance (for instance due to variation in the stent compression and subsequent stent expansion) and to include a shape that can be repeatedly reproduced, either on the same replacement heart valve or in a series of (e.g. two) replacement heart valves. Suitable shape memory materials are well-known to the skilled person and may include synthetic or natural polymeric materials which are cross-linked or annealed in the shape to be memorized such that deviation from the memorized form creates internal tension (or, more generally, a higher energy state) which can be relieved (or, more generally, released) from the shape memory material when it returns to its memorized shape. In some embodiments, the one or more pre-shaped bulges 110 and the outer wall 140 of the pocket 150 may be a unitary body, i.e. the pre-shaped bulges 110 may be an integral part of the outer wall 140.

In some embodiments, the outer wall 140 of the pocket 150 and the one or more pre-shaped bulges 110 may comprise the same material. In some embodiments, the outer wall 140 of the pocket 150 and the one or more pre-shaped bulges 110 of the pocket 150 may be made or consist of the same material.

As stated above, the sealing skirt 100 may comprise at least one pocket 150. In some embodiments, the sealing skirt 100 may comprise one pocket 150, in particular one pocket 150 which extends circumferentially around the stent valve 10 or has an annular shape. In some embodiments, the sealing skirt 100 may comprise more than one pocket 150, for instance two, three, four, five, or six pockets 150 or a number of n pockets 150 where n is an integer selected from the range of 2 to about 30, more specifically 3 to about 20, and in particular 4 to about 10. In some embodiments, a plurality of pockets 150 may be arranged annularly at generally the same axial level of the sealing skirt. In some embodiments, a plurality of pockets 150 may be arranged in two or more sets of pockets 150 which are each arranged annularly at generally the same axial level of the sealing skirt, wherein the first set of pockets 150 is arranged at a different axial level of the sealing skirt 100 than the second and, if present, any other set of pockets 150.

In some embodiments, at least one of the pockets 150 may be compartmentalized into a plurality of compartments which are in fluid communication. For instance, pocket 150 may be an annular pocket having an inflow edge which is fastened via one or more attachment portions 144 (e.g. a suture or a glued spot) to the stent component, the valve component or skirt material. Such fastening compartmentalizes the pocket 150 into segments. In this example, pocket 150 has multiple segments which are in fluid communication with each other. In addition, in this example, each segment has an individual opening blood inflow, i.e. pocket 150 has multiple openings for blood inflow.

Figure 2A:
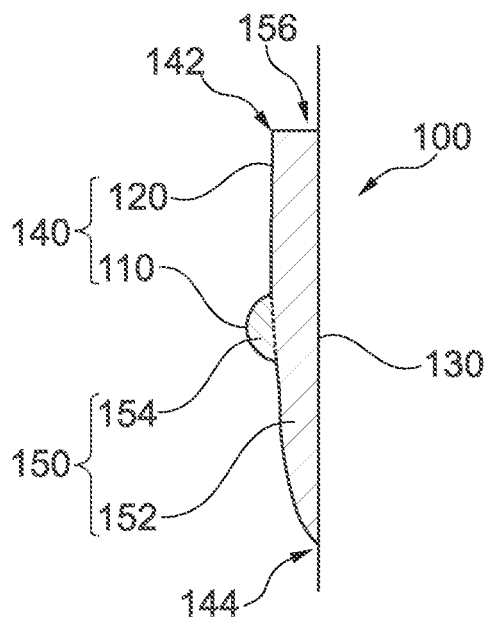
FIGS. 2a and 2b are schematic drawings illustrating a cross-section of a sealing skirt 100 in a side cut view showing the pocket 150 and the thickness/depth dimension 113, 115 of a bulge 110.

In some embodiments, it may be particularly useful that the outer wall 140 comprises a generally tubular portion 120 (see, for instance FIG. 2a and FIGS. 4a to 7). In some embodiments, the outer wall 140 may be formed as a sheet and folded in a generally tubular form to build the generally tubular portion 120. The one or more pre-shaped bulges 110 may be formed in the generally tubular portion 120. In some embodiments, the expression "generally tubular portion" can describe a shape in the expanded state which is tubular and/or may be further barreled, i.e. slightly bulged radially outward in the deployed state and/or in the expanded state. "Barreled" may describe a shape which is formed of as at least a portion of an outer wall of a barrel. In this regard, FIGS. 4a and 4b shows a generally tubular portion 120 which is tubular shaped. FIG. 2a shows a generally tubular portion 120 which is generally tubular but slightly bulges radially outward, i.e. slightly barreled. Although, not expressly denoted in all figures, in all depicted embodiments, the outer wall 140 may comprise a generally tubular portion 120. As can be seen best, for example, in FIGS. 4a and 4b, the one or more pre-shaped bulges 110 (in this instance three bulges 110) may be distributed or arranged in the generally tubular portion 120. In other words, the one or more pre-shaped bulges 110 may protrude radially outwardly from the tubular portion 120. Alternatively described, the outer wall 140, i.e. the generally tubular portion 120 may be provided with the one or more pre-shaped bulges 110, specifically in a predetermined pattern. In some embodiments, the exact shape of the generally tubular portion in a deployed state may depend on the specific conditions at an implantation site, for instance the native anatomy of a patient.

In some embodiments, in the expanded state, the one or more pre-shaped bulges 110 may be configured to be extendable radially outward independently of the pocket 150 being able to distend radially outward. In other words, a first or general expansion/distension of the pocket 150 may occur independently of a second or local expansion/distension of the bulges 110. Alternatively described, a first or general expansion/distension of the first pocket section 152 may occur independently of a second or local expansion/distension of any of the second pocket sections 154. In some embodiments, specifically in the expanded state, the generally tubular portion 120 may be distensible radially outward. Additionally, the generally tubular portion 120 may be distensible radially outward to form a first pocket section 152 of the pocket 150 (see, FIG. 2a). In some embodiments, specifically in the expanded state, each of the one or more pre-shaped bulges 110 may be distensible radially outward. Thereby, each of the one or more pre-shaped bulges 110 may be distensible radially outward to extend further radially outward from the generally tubular portion 120. As shown in the schematic illustration of the sealing skirt 100 shown in FIG. 2a each of the one or more pre-shaped bulges 110 may be distensible further radially outward than the generally tubular portion 120. Each of the one or more pre-shaped bulges 110 may form a respective second pocket section 154 of the pocket 150. That means, the pocket 150 may comprise a first pocket section 152 and one or more second pocket sections 154 (depending on the number of bulges 110). The first pocket section 152 and the second pocket section 154 may form one pocket volume. In other words, fluid may flow freely between first pocket section 152 and any of the second pocket section 154. That means, there may not be any barrier (e.g. a material layer with or without holes, e.g. pores or cuts) at a junction between any of the second pocket sections 154 and the first pocket section 152. In some embodiments, any of the one or more bulges 110 may only be opened towards an interior of the pocket 150. In other words, any of the one or more bulges 110 may only be opened to the first pocket section 152. Described alternatively, any of the second pocket section 154 In some embodiments, in the expanded state, the first pocket section 152 may be configured to be formed independently from any of the second pocket sections 154. Alternatively or additionally, at least a portion of the first pocket section 152 and/or at least a portion of any one of the second pocket sections 154 may be formed in the expanded state. That means, specifically depending on the specific conditions at an implantation site, for instance the native anatomy of a patient, only a portion of the first pocket section 152 and/or only a portion of any of the second pocket sections 154 may be formed. In one non-limiting example, the first pocket section 152 may only be partly formed in the deployed state (at an implantation side). However, any of the second pocket sections 154, i.e. the bulges 110, may be fully or partly formed. In some embodiments, in the expanded state, the first pocket section 152 may be configured to extend continuously or intermittently at least about an angle of about 180°, specifically at least about an angle of about 270°, more specifically at least about an angle of about 360° along a circumference of the inner tubular wall 130. Alternatively or additionally, the first pocket section 152 may be configured to form an annular pocket, specifically in the expanded state. In some embodiments, in the expanded state, any of the second pocket section 154 may be configured to extend continuously or intermittently at least about an angle of about 180°, specifically at least about an angle of about 270°, more specifically at least about an angle of about 360° along a circumference of the outer wall 140, specifically radially outwards of the first pocket section 154. Alternatively or additionally, any of the second pocket sections 154 may be configured to form an annular pocket, specifically in the expanded state. Having annular shaped pockets or pocket sections may be advantageous as, in the deployed state blood may inflow into the pocket in a retrograde direction and may dispense circumferentially.

In some embodiments, the first pocket section 152 may be referred to as "first sealing stage". Alternatively or additionally, the second pocket sections 154 may be referred to as "second sealing stage" or "additional sealing stage". Having a pocket 150 in general may lead to the effect, that any leakage of blood around the valve in the reverse/retrograde direction from the axial outflow end 20b towards the axial inflow end 20a may inflow into the pocket 150 and may bias the outer wall 140 radially outward. Thereby a sealing effect of the sealing skirt 100 may be increased. The second sealing stage, i.e. the one or more bulges 110 (also the second pocket sections 154) may additionally seal against paravalvular leakage. Thereby, the one or more second pocket sections 154 may adapt conforming to the contours of the native anatomy (e.g. native annulus and/or native leaflets) by distension of some or all of the one or more pre-shaped bulges depending upon the anatomy at the implantation site. Having a pocket 150 with a first pocket section 152 and one or more second pocket sections 154 may lead to an improved sealing skirt 100 being more flexible and/or having better adaptation capabilities to irregularities of native anatomy at the implantation site.

In some embodiments, the one or more pre-shaped bulges 110 may be pre-formed in the outer wall 140 in a predetermined pattern (see, for instance FIGS. 4a to 7). In some embodiments, the predetermined pattern may be adjusted to cover, in the deployed state, areas critical or susceptible to paravalvular leakage. These areas may, for instance, be specific areas of a general native annulus/leaflets having irregularities and/or specific areas of an individual native annulus/leaflets having irregularities and/or specific areas where calcification occurs. Thereby, depending upon the native anatomy at the implantation site, the one or more pre-shaped bulges 110 may provide a sealing capacity in the predetermined pattern or at least a portion of the predetermined pattern.

In some embodiments, specifically in the expanded state, it may advantageous that at least one of the one or more pre-shaped bulges 110 may be configured to extend radially outward continuously or intermittently at least about an angle of about 180°, specifically at least about an angle of about 270°, more specifically at least about an angle of about 360° along a circumference of the outer wall 140. In other words, the second pocket section 154 may be configured to extend radially outward continuously or intermittently at least about an angle of about 180°, specifically at least about an angle of about 270°, more specifically at least about an angle of about 360° along a circumference of the outer wall 140. In one non-limiting example of FIGS. 4a and 4b, which show the outer wall 140 of the sealing skirt 100 in the expanded state, three pre-shaped bulges 110 may extend continuously about an angle of about 360° along a circumference of the outer wall 140. In other embodiments, only one, two or more than three pre-shaped bulges may extend continuously about an angle of about 360° along a circumference of the outer wall 140. In some embodiments, the expression "along a circumference" may not necessarily mean in a circumferential direction but only that a sector of about 180°, about 270°, or about 360° on the circumference of the outer wall 140 may be covered by the one or more pre-shaped bulges 110. However, in the non-limiting example of FIGS. 4a and 4b, the pre-shaped bulges 110 extend along a circumference of the outer wall (140) in a circumferential direction of the outer wall (140). In some embodiments, the expression "circumferential direction" can be understood as a "straight" circumferential direction, i.e. circumferentially around an axis of the stent 20 or an axis of the outer wall 140 (specifically an axis of the generally tubular portion 120). The pre-shaped bulges 110 may extend continuously in a circumferential direction to form a closed loop/ring. Thereby, for instance, interruptions in the bulge 110 may be avoided and, therefore, the risk of paravalvular leakage at such interruptions may be reduced. In other words, the pre-shaped bulges 110 may have a continuous closed loop or annular form without a distinct termination.

In some embodiments, the one or more pre-shaped bulges 110 at least one of the one or more pre-shaped bulges 110 may be configured to extend radially outward along a circumference of the outer wall 140 in a direction inclined with respect to a circumferential direction of outer wall 140 as shown in the non-limiting example of FIG. 5. In this regard, FIG. 5 schematically illustrate the outer wall 140 of the sealing skirt 100 in the expanded state, wherein the outer wall comprises one pre-shaped bulge 110. The pre-shaped bulge 110 is arranged spiraling on the outer wall 140, i.e. on the generally tubular portion 120 of the outer wall 140. The pre-shaped bulge 110 may be arranged upwardly or downwardly spiraling. In some embodiments, more than one pre-shaped spiraling bulge 110 may be provided which may be axially offset from each other. In some embodiments, the expression "axially offset" can mean that the one or more pre-shaped bulges 110 may partly overlap in a circumferential direction. In the non-limiting examples of FIGS. 6 and 7, variations of pre-shaped bulges 110 are shown, which may be configured to extend radially outward intermittently along a circumference of the outer wall 140 in a straight circumferential direction and in a direction inclined to the straight circumferential direction. In some embodiments, these intermittent shapes of the one or more pre-shaped bulges 110 may be dotted and/or striped and/or inclinedly striped. In some embodiments, an intermittent shape may provide a locally more focused sealing and/or may avoid a concentration of sealing skirt material at a single axial level, in particular in the compressed state.

Figure 8:
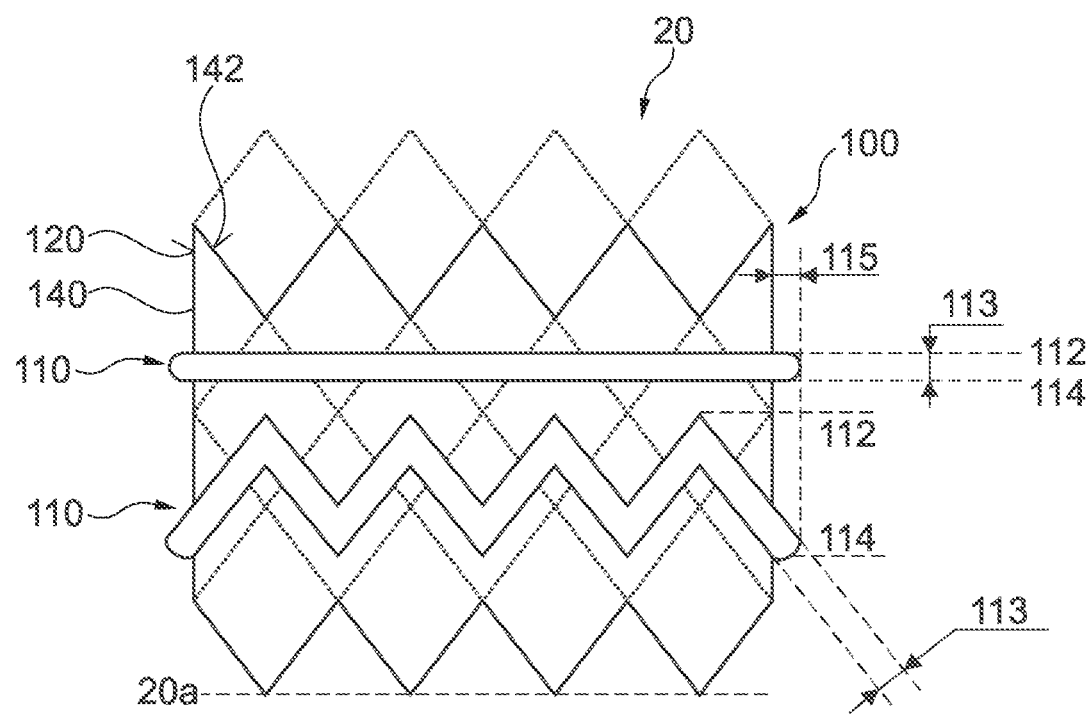
FIG. 8 is a schematic drawing illustrating a stent-valve 10 with a sealing skirt 100 in a front view, exemplary depicting different bulges 110 and their arrangement with respect to the stent 20 and its lattice structure.

In some embodiments, specifically in the expanded state, at least one of the one or more pre-shaped bulges 110 may be configured to extend radially outward along a circumference of the outer wall 140 in a meandering shape, for instance, a zig-zag-shape, a wave-shape or sinuous shape. In some embodiments, the stent 20 may comprise a lattice structure of cells defined by interconnected struts. Additionally, the meandering shape of the at least one of the one or more pre-shaped bulges 110 may generally follow a shape defined by respective underlying struts. In one non-limiting example, FIG. 7 shows an intermittent meandering shape of the lower bulge 110. The meandering shape may alter between upper axial level 112 (closer to the axial outflow end 20*b*) and a lower axial level 114 (closer to the axial inflow end 20*a*). Although shown intermittently in FIG. 7, the meandering shape may be a closed loop, for instance connecting portions of the bulge 110 at the upper axial levels 112 and the lower axial levels 114 (see, for instance FIG. 8). In some embodiments, turning portions of the meandering shape, i.e. the portions at axial upper levels 112 and axial lower levels 114 may be arranged to cover a portion of a respective cell in the expanded state. Thereby, a concentration of material at least in the compressed state may be avoided. Additionally, the turning portions may not overlap with underlying struts.

In some embodiments, the shape of at least one of the one or more pre-shaped bulges 110 may be configured such that, specifically in the expanded state, at each axial level of the outer wall 140, the fraction of a circumference of the outer wall 140 occupied the one or more pre-shaped bulges 110 is less than about 100%, optionally less than about 90%, optionally less than about 80%, optionally less than about 70%. In some embodiments, it may be advantageous that the fraction occupied by the one or more pre-shaped bulges at each axial level of the outer wall is between about 20% and about 70%. These specifications may specifically refer to the meandering shapes and/or the intermittent shapes. In some embodiments, in the deployed state, the fraction may be even lower because some of the pre-shaped bulges 110 or portions thereof may not or not fully extend radially outwardly due to the native anatomy at the implantation site.

Figure 2B:
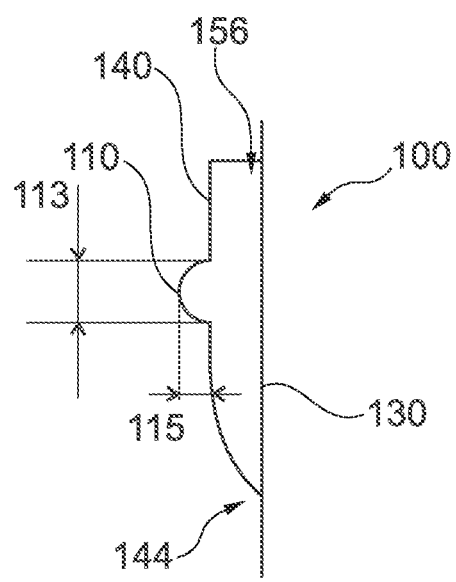

In some embodiments, specifically in the expanded state, a thickness 113 may vary in a circumferential direction and/or in an axial direction of the outer wall 140. Alternatively or additionally, specifically in the expanded state, a depth 115 of at least one of the one or more pre-shaped bulges 110 may vary in a circumferential direction and/or in an axial direction of the outer wall (140). In some embodiments, the expression "thickness 113" may be a dimension of the pre-shaped bulge 110 in a direction generally perpendicular to the radial direction on an outer shell surface of the outer wall 140, specifically of the tubular wall portion 120 (see, FIGS. 2*b* and 8). In some embodiments, thickness 113 may be a dimension perpendicular to an extension direction of the meandering shape or of the closed loop shape. In some embodiments, the expression "depth 115" may be a dimension of the pre-shaped bulge 110 measured in a generally radial direction (see, FIGS. 2*b* and 8). In some embodiments, specifically in the expanded state, a thickness 113 and/or a depth 115 may be constant in a circumferential direction and/or in an axial direction of the outer wall 140.

In some embodiments, specifically in the expanded state, the outer wall 140 may comprise a plurality of pre-shaped bulges 110 which are axially and/or circumferentially distanced from each other. For instance, the outer wall 140 may comprise two, three, four, five or more pre-shaped bulges 110 which are axially distanced from each other. With regard to the non-limiting examples of FIGS. 3*b* and 4*a*, three pre-shaped bulges 110 may be provided. The three pre-shaped bulges 110 may be axially spaced or distanced. In some embodiments, the expression "axially distanced" can mean axially spaced or axially offset. In some embodiments, the expression "axially spaced" can mean that the one or more pre-shaped bulges do not overlap in a circumferential direction. Axially offset may be understood as explained further above. It should be understood that different shapes may be varied at different numbers of pre-shaped bulges 110. In other words, a sealing skirt 100 comprise several pre-shaped bulges 110 on the outer wall 140. Thereby, all of the several pre-shaped bulges 110 may be configured similarly comprising any of the herein disclosed features, specifically shapes. Alternatively, some or all of the several pre-shaped bulges 110 may be configured differently comprising any of the herein disclosed features, specifically shapes.

In some embodiments, specifically at least in the expanded state, the pocket 150 may have an opening 156. The opening 156 may face in the antegrade direction towards the axial outflow end 20*b* (see, for instance FIG. 1*a*). In some embodiments, the opening 156 may have an annular shape formed between the inner tubular wall 130 and the outer wall 140.

Figure 3A:
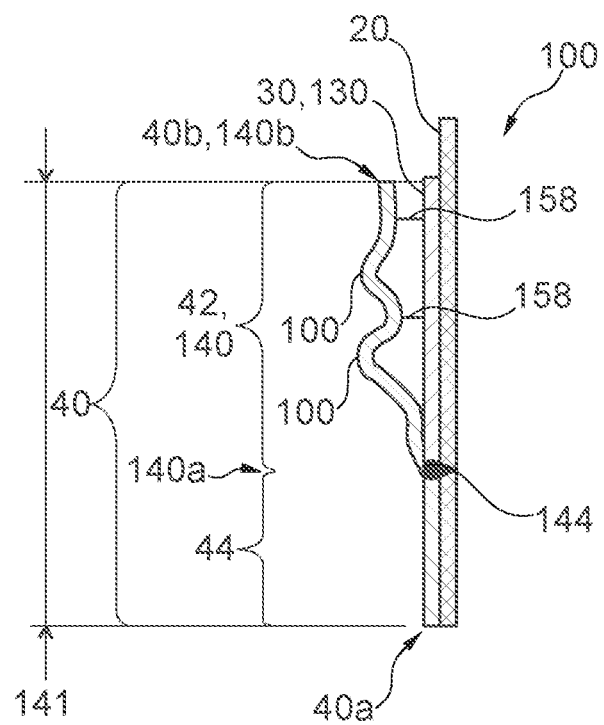
FIGS. 3a and 3b are schematic drawings illustrating a cross-section of a sealing skirt 100 and a stent 20 in a side cut view.
Figure 3B:
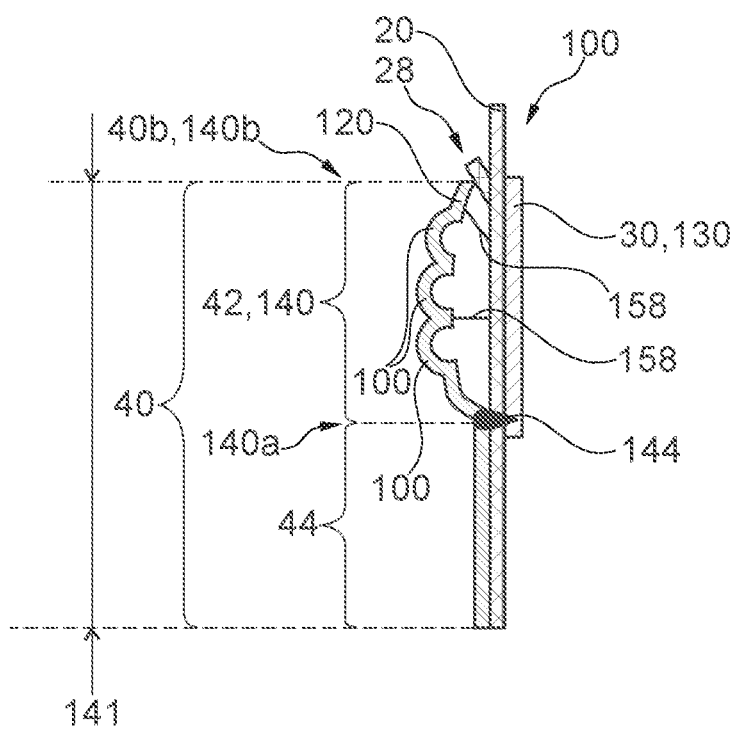

In some embodiments, the outer wall 140 of the pocket 150 may have a first axial end 140*a* (see, for instance FIGS. 3*a* and 3*b*). The first axial end may be arranged towards the axial inflow end 20*a*. In some embodiments, the outer wall 140 may have a second axial end 140*b*. The second axial end may be arranged towards the axial outflow end 20*b*. The outer wall 140 of the pocket may have a free circumferential edge 142 at the second axial end 140*b*. The free circumferential edge may be directed towards the axial outflow end 20*b*. Additionally, specifically at least in the expanded state, the opening 156 of the pocket 150 may be formed by the free circumferential edge 142 conjointly with the inner wall 30. In other words, the opening 156 may be formed between the free circumferential edge 142 and the inner wall 30 In some embodiments, at least in the expanded state, the free circumferential edge 142 may be arranged at an axial position of the stent 20 between the axial inflow end 20a and an upper crown 28 of the stent 20. In some embodiments, at least in the expanded state, the free circumferential edge 142 may have a substantially straight edge (see, for instance FIGS. 4a, 6 and 7). Alternatively, at least in the expanded state, the free circumferential edge 142 may have a non-straight edge, for instance, an undulating shape, or castellated shape, or notched shape (see, for instance FIGS. 5 and 8). In some embodiments, the non-straight edge may align with apexes of an upper crown 28 of the stent 20 (see, for instance FIG. 8). It should be understood that the shape of the circumferential edge 142 is not limited to those example configurations of the respective figures. In some embodiments, providing a non-straight edge may enable a reduction in the bulk of material of the sealing skirt 100 to be compressed for loading on to or into a delivery apparatus, which may be significant when the sealing skirt overlaps a region of the stent valve that is "crowded" in terms of stent material and/or leaflet material and/or skirt material to be compressed.

Figure 10A:
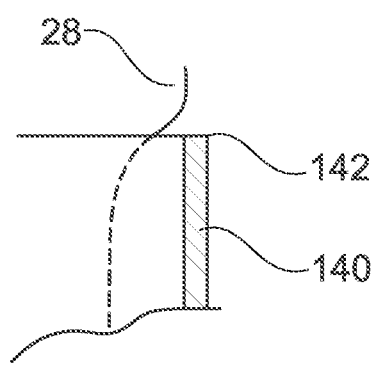
FIGS. 10a to 10c are schematic drawings illustrating relative arrangements between the outer wall 140 and an upper crown 28.
Figure 10B:
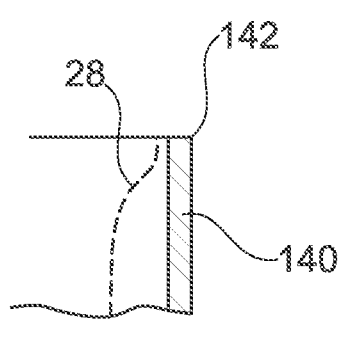
Figure 10C:
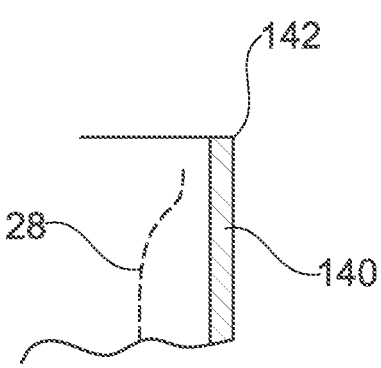

In some embodiments, the outer wall 140 may be attached to the stent 20 via an attachment portion 144 at the first axial end 140a of the outer wall 140 (see, for instance FIGS. 1a, 3a and 3b). A bottom of the pocket 150 may be formed by the outer wall 140 conjointly with the inner tubular wall 130. Alternatively or additionally, the outer wall 140 may be attached to the inner tubular wall 130 via an attachment portion 144 at the first axial end 140a (see, for instance FIGS. 1a, 3a and 3b). A bottom of the pocket 150 may be formed by the outer wall 140 conjointly with the inner tubular wall 130. In some embodiments, the attachment portion 144 may be arranged at an axial position of the stent 20 between the axial inflow end 20a and an upper crown 28 of the stent 20. In some embodiments, the outer wall 140 and the inner tubular wall 130 may overlap at least to some extent in the radial direction. Alternatively or additionally, the outer wall 140 and the inner tubular wall 130 may overlap at least in the area of the attachment portion 144. In some embodiments, at least in the expanded state, the free circumferential edge 142 may be arranged at an axial position of the stent 20 between the attachment portion 144 and an upper crown 28 of the stent 20. In other words, at least in the expanded state, the free circumferential edge 142 may be arranged at an axial position axially below the upper crown 28 of the stent 20 (see, for instance FIG. 10a). Alternatively, at least in the expanded state, the free circumferential edge 142 may be arranged at an axial position of or axially above the upper crown 28 of the stent 20 (see, for instance FIGS. 10b and 10c).

In some embodiments, the outer wall 140 may be a generally tubular wall such that, at least in the expanded state, the pocket 150 is configured to assume the shape of an annular pocket formed between the inner tubular wall 130 and the outer wall 140.

Figure 9A:
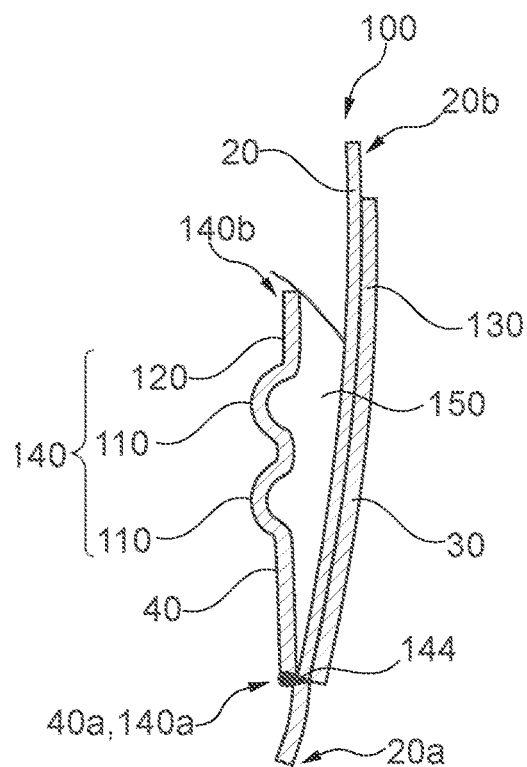
Figure 9B:
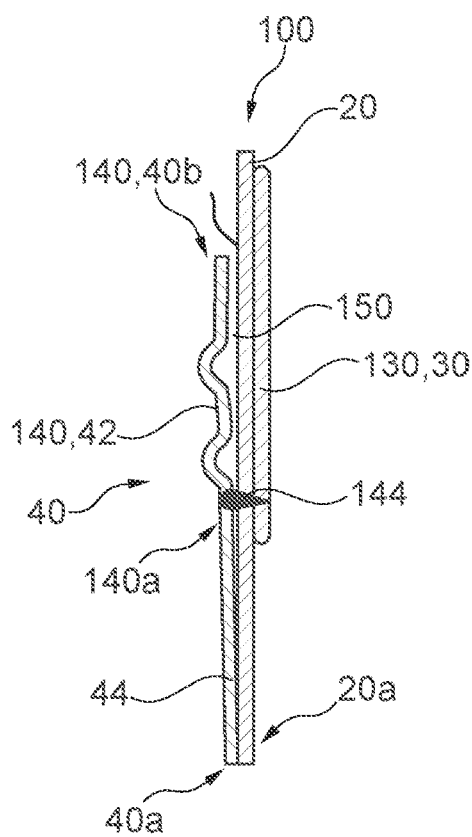
FIG. 9b is a schematic drawing illustrating a cross-section of a sealing skirt 100 and a stent 20 in a side cut view similar to the illustration of FIG. 1b but comprising two bulges 110.
Figure 9C:
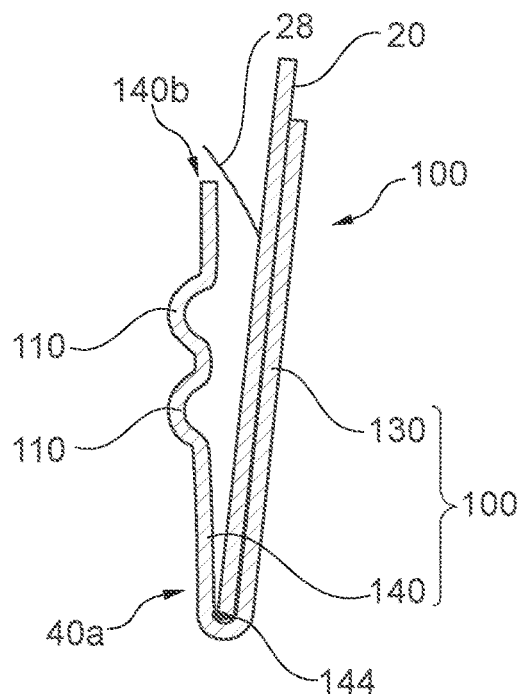
FIG. 9c is a schematic drawing illustrating a cross-section of a sealing skirt 100 and a stent 20 in a side cut with an everted skirt.

In some embodiments, the sealing skirt 100 may be attached to the stent 20 on an interior of the stent 20 (see, for instance FIG. 9c). The sealing skirt 100 may be everted around the axial inflow end 20a such that a portion of the sealing skirt 150 being on the interior of the stent 20 may form the inner tubular wall 130. A portion of the sealing skirt 150 being everted and extending towards the axial outflow end 20b may form the outer wall 140.

In some embodiments, the inner wall 130 may be an inner skirt 30. The inner skirt 30 may be arranged, specifically may be attached to the stent 20, on an interior of the stent 20 (see, for instance FIG. 3b). In other words, the inner wall 130 may be an inner skirt 30 captive to the stent 20. Alternatively, the inner skirt 30 may be arranged, specifically may be attached to the stent 20, on an exterior of the stent 20 (see, for instance FIG. 3a). In other words, the inner tubular wall 130 may be an inner skirt 30 attached to the stent 20 on an exterior of the stent 30. In some embodiments, the inner wall 130, specifically the inner skirt 30 may cover open cells of a lattice structure of the stent 20 from the interior and/or from the exterior of the stent 20 depending on where the inner tubular wall 130, specifically the inner skirt 30 is attached to the stent 20. In some embodiments, the outer wall 140 may be at least a portion of an outer skirt 40. The outer wall 140, specifically the outer skirt 40, may be arranged and/or extend radially outside of the tubular inner wall 130, specifically radially outside of the inner skirt 30 (see, for instance FIGS. 1a, 1b, 3a, 3b, 9a, 9b). Alternatively or additionally, the outer wall 140, specifically the outer skirt 40, may be arranged and/or extend on the exterior of the stent 20.

In some embodiments, the outer skirt 40 may have a first outer skirt end 40a. The first outer skirt end 40a may be arranged towards the axial inflow end 20a. In some embodiments, the outer skirt 40 may have a second outer skirt end 40b. The second outer skirt end may be arranged towards the axial outflow end 20b. In some embodiments, the first outer skirt end 40a and/or the second outer skirt end 40b may be respective axial ends.

Figure 1B:
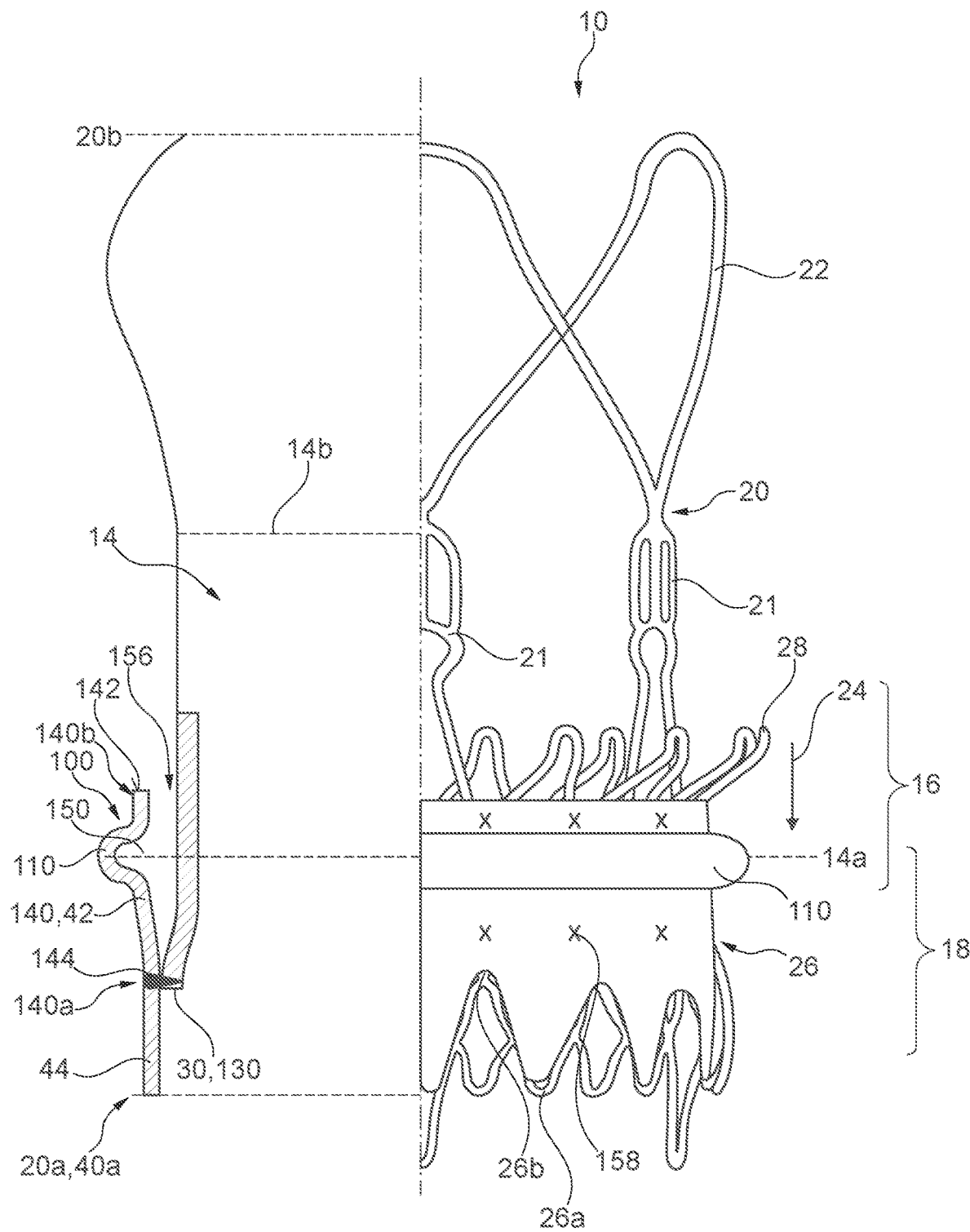
FIG. 1b is a schematic drawing illustrating a stent-valve 10 with a sealing skirt 100 comprising one bulge 110 in a split view showing a side cut and a front view, wherein in the front view the stent 20 is partly covered by the sealing skirt 100.

In some embodiments, the first outer skirt end 40a may be arranged at the axial inflow end 20a (see, for instance FIGS. 1b, 3a, 3b). In some embodiments, the outer wall 140 may be a first outer skirt portion 42 of the outer skirt 40. The outer wall 140, specifically the first outer skirt portion 42, may extend from the second outer skirt end 40b to an attachment portion 144. In some embodiments, the first outer skirt portion 42 may be free to deploy relative to the stent 20 between the second outer skirt end 40b and an attachment portion 144. Alternatively or additionally, the outer skirt 40 may be attached to the stent 20 and/or the inner skirt 30 via the attachment portion 144 to form a bottom of the pocket 150 conjointly with the inner skirt 30. In some embodiments, the outer skirt 40 may comprise a second outer skirt portion 44. The second outer skirt portion 44 may extend from the attachment portion 144 to the first outer skirt end 40a (see, for instance FIGS. 3a, 3b, 9b). In some embodiments, the second outer skirt portion 44 may be attached to the stent 20. In some embodiments, the second outer skirt portion 44 may be attached to the stent 20 between the attachment portion 144 and the first outer skirt end 40a. In some embodiments, the second outer skirt portion 44 may cover open cells of a lattice structure of the stent 20 between the attachment portion 144 and the first outer skirt end 40a and/or between the attachment portion 144 and the axial inflow end 20a. In some embodiments, the attachment portion 144 may define the first axial end 140a of the outer wall 140a, i.e. the end of the first outer skirt portion 42 towards the second outer skirt portion 44. In some embodiments, the first outer skirt portion 42 and the second outer skirt portion 44 may be integrally formed together.

In some embodiments, the stent-valve 10 the plurality of leaflets 14 may define a valve component. The valve component may further comprise a tubular inflow section. In some embodiments, the valve component may have a valve inflow end 14a and/or a valve outflow end 14b. In some embodiments, the valve inflow end 14a may be arranged at an extremity of the valve component closest to the axial inflow end 20a. In some embodiments, the valve outflow end 14b may be arranged at an extremity of the valve component closest to the axial outflow end 20b. In some embodiments, the tubular inflow section may be arranged axially below the leaflets 14. In other words, the tubular inflow section may be arranged axially below the leaflets 14 towards the axial inflow end 20a of the stent 20.

In some embodiments, the inner tubular wall 130 may be formed by a tubular inflow section of a valve component. In some embodiments, the outer wall 140 may be formed by a tubular inflow section of a valve component. In some embodiments, the tubular inflow section of the valve component may extend to the axial inflow end 20a. Alternatively or additionally, the tubular inflow section may be everted around the axial inflow end 20a. Alternatively or additionally, a portion of the tubular inflow section being on the interior of the stent 20 may form at least a portion of or the whole the inner tubular wall 130. Alternatively or additionally, a portion of the leaflets 14 may form at least a portion of the inner tubular wall 130. Alternatively or additionally, a portion of the tubular inflow section being everted and extending towards the axial outflow end 20b may form the outer wall 140. Alternatively, the outer wall 140 may be an outer skirt 40 which is attached to the portion of the tubular inflow section being on the interior of the stent 20 forming at least a portion of the inner tubular wall 130. In some embodiments, specifically in the expanded state, the valve component may axially extend from a valve inflow end 14a to a valve outflow end 14b. The outer wall 140 may be attached to the stent 20 and/or the inner wall 130 via an attachment portion 144 to form a bottom of the pocket 150 conjointly with the valve component (i.e. the inner tubular portion and/or the leaflets 14). The attachment portion 144 may be arranged at an axial height of the valve inflow end 14a. In some embodiments, the leaflets 14 and the inner tubular inflow section may be formed as a unitary component to form the valve component. In some embodiments, specifically at least in the expanded state, a free circumferential edge 142 of the outer wall 140 may be arranged at an axial height between the valve inflow end 14a and the valve outflow end 14b.

In some embodiments, specifically at least in the expanded state, a free circumferential edge 142 of the outer wall 140 may be arranged at an axial height of an upper crown 28 of the stent 20 or slightly below. Alternatively or additionally, specifically at least in the expanded state, the upper crown 28 may be configured to bias the free circumferential edge 142 radially outward. In some embodiments, at least in the expanded state, at least a portion of the upper crown 28 may extend radially outward.

In some embodiments, specifically in the expanded state, the leaflets 14 may axially extend from a valve inflow end 14a to a valve outflow end 14b. In some embodiments, the inner tubular wall 130 may overlap with an axial position of the valve inflow end 14a. Alternatively or additionally, the leaflets 14 may be directly or indirectly attached to the inner tubular wall 130 at an axial position of the valve inflow end 14a. In some embodiments, specifically at least in the expanded state, the pocket 150 may extend between the valve inflow end 14a and the valve outflow end 14b. Alternatively, at least a portion of the pocket 150 may extend between the valve inflow end 14a and the valve outflow end 14b. In some embodiments, specifically at least in the expanded state, at least a portion of the outer wall 140 may extend between the valve inflow end 14a and the valve outflow end 14b. In some embodiments, specifically at least in the expanded state, a free circumferential edge 142 of the outer wall 140 may be arranged at an axial height between the valve inflow end 14a and the valve outflow end 14b. In some embodiments, specifically at least in the expanded state, at least one of the one or more pre-shaped bulges 110 may be arranged at an axial height between the valve inflow end 14a and the valve outflow end 14b.

In some embodiments, specifically at least in the expanded state, the outer wall 140 may be attached to the stent 20 and/or the inner tubular wall 130 via an attachment portion 144 at a first axial end 140a of the outer wall 140 to form a bottom of the pocket 150 conjointly with the inner tubular wall 130. In some embodiments, specifically at least in the expanded state, the attachment portion 144 may be arranged at an axial height between the valve inflow end 14a and the valve outflow end 14b. In some embodiments, specifically at least in the expanded state, the attachment portion 144 may be arranged at an axial height between the valve inflow end 14a and the axial inflow end 20a.

In some embodiments, one or more control attachments 158 may be formed between the outer wall 140 and the stent 20 (see, for instance FIGS. 1a, 1b, 3a, 3b). Alternatively or additionally, one or more control attachments 158 may be formed between the outer wall 140 and the inner tubular wall 130. The one or more control attachments 158 may be configured to permit the outer wall 140 to distend substantially freely, while preventing everting of the outer wall (140). Prevention of everting may be for instance advantageous, during compression and loading the stent-valve 10 by an inexperienced user. In some embodiments, at least one of the one or more control attachments 158 may be arranged at a free circumferential edge 142 of the outer wall 140. Alternatively or additionally, at least one of the one or more control attachments 158 may be arranged adjacent, specifically directly adjacent, to a free circumferential edge 142 of the outer wall 140 (see, for instance FIGS. 1 and 1b). The at least one of the one or more control attachments 158 may be arranged axially adjacent towards the axial inflow end 20a. In some embodiments, at least one of the one or more control attachments 158 may be arranged at an axial height between a first axial end 140a of the outer wall 140 and a second axial end 140b of the outer wall 140. In some embodiments, a plurality of control attachments 158 may be provided. In some embodiments, at least two, three, four, five, six or more control attachments 158 may be provided. Alternatively or additionally, the plurality of control attachments 158 may be distributed circumferentially. Alternatively or additionally, the control attachments 158 may be distributed equally or unequally spaced. Alternatively or additionally, some or all of the control attachments 158 may be arranged at different axial heights. In this regard, the non-limiting example of FIG. 1b schematically shows a plurality of control attachments 158 depicted as little crosses.

In some embodiments, specifically in the expanded state, the one or more pre-shaped bulges 110 may be configured to extend radially outward independently of a foreshortening of the stent 20 during expansion. In some embodiments, an axial length 141 of the outer wall 140 may be substantially about the same in the compressed state and in the expanded state (see, axial length 141 in the expanded state in FIGS. 3a and 3b). In some embodiments, the axial length 141 of the outer wall 140 may shorten less than about 30%, specifically less than about 15% and more specifically less than about 5% from the compressed state to the expanded state.

In some embodiments, the stent 20 may comprise at least one of: a lower tubular portion 26, an upper crown portion 28, a plurality of upstanding commissural supports 21, and/or a plurality of stabilization arches 22. In some embodiments, the stent 20 may comprise the lower tubular portion 26. In some embodiments, the stent 20 may comprise the lower tubular portion 26, the upper crown portion 28, a plurality of upstanding commissural supports 21, and the plurality of stabilization arches 22. In some embodiments, the lower tubular portion 26 may communicate with the upper crown 28 and the commissural supports 21. Alternatively or additionally, the commissural supports 21 may upstand relative to the upper crown portion 28. Alternatively or additionally, the stabilization arches 22 may communicate with the commissural supports 21. In some embodiments, specifically at least in the expanded state, the one or more pre-shaped bulges 110 may be positioned between and spaced from respective extremities of both a free edge of the upper crown portion 28, and a free edge of the lower tubular portion 26. In some embodiments, specifically at least in the expanded state, at least one of the one or pre-shaped bulges 110 may be arranged at an axial height of the lower tubular portion 26. Alternatively or additionally, at least one of the one or pre-shaped bulges 110 may be arranged at an axial height of an extremity of the lower tubular portion 26 the furthest away from the axial inflow end 20a.

In some embodiments, the outer wall 140 and/or the inner tubular wall 130 may be formed of material selected from: biological tissue, for instance pericardial tissue, metal, for instance metal foil, synthetic material and combinations thereof. In some embodiments, the synthetic material may be selected from: fabric; hydrogel; foam; sponge; porous fibrous material. In some embodiments, the outer wall 140 and/or the inner tubular wall 130 may be formed of material selected from: biologic materials, polymeric materials, fabric materials, permeable materials, impermeable materials, materials that promote tissue ingrowth, materials that retard tissue ingrowth, foam materials, sealing materials, and combinations thereof. In some embodiments, the one or more pre-shaped bulges 110 may be formed of the same or of a different material than generally tubular portion 120.

It should be understood that the aforementioned embodiments of the first aspect of the present disclosure are freely combinable with each other and that their combination is contemplated as part of and within the scope of the present disclosure.

In a second aspect, the present disclosure relates to a method for fabricating a sealing skirt 100 of a cardiac stent-valve 10 (see, FIGS. 11 to 16).

In some embodiments, the sealing skirt 100 may be fabricated by the following steps (see, for instance FIG. 11): In one step, a skirt material 210 may be arranged on a first mold 220, 230. In some embodiments, the first mold 220 may have first surface contour 222 with one or more protrusions 226. In some embodiments, the first mold 230 may have a first surface contour 232 with one or more recesses 236. In another step, specifically subsequently, the skirt material 210 may brought into contact with the first surface contour 222, 232 such that a shape of the skirt material 210 follows the first surface contour 222, 232 of the first mold 220, 230. Alternatively or additionally, a shape of the skirt material 210 may form one or more bulges 110 corresponding to the one or more protrusions 226 and/or corresponding to one or more recesses 236. In another step, specifically subsequently, the skirt material 210 may be held in contact with the first surface contour 222, 232. In another step, the skirt material 210 may be fixed. In some embodiments, the fixing or a sub-step of fixing may be performed during holding. In some embodiments, fixing may comprise chemically or physically crosslinking a crosslinkable material in the skirt material 210. Alternatively or additionally, fixing may comprise heat treating to anneal the skirt material 210. Crosslinking and/or heat treating may fix or memorize the bulges 110 in the skirt material 210 such that pre-shaped bulges 110, in particular pre-molded bulges 110, are formed in the skirt material 210.

General Aspects of the Method for Fabricating a Sealing Skirt 100

In the following, various general aspects of the method may be described which may account for some or for all embodiments. It should be understood that some or all of the following embodiments are combinable with each other and/or with any of the embodiments of the aforementioned first aspect and/or any of the following aspects (in particular aspects of the flat molds and/or aspects of the cylindrical molds and/or the aspects of the first and second molds and/or aspects of the clamping elements and/or aspects of the fluid pressure and/or aspects of the materials).

In some embodiments, it may be advantageous that holding is performed for at least about 12 hours, specifically for at least about 18 hours, and more specifically for at least about 24 hours. It may be further advantageous if fixing or a sub-step of fixing is performed for at least about 12 hours, specifically for at least about 18 hours, and more specifically for at least about 24 hours. In some embodiments, it may be particularly useful to perform chemically or physically crosslinking for at least about 12 hours, specifically for at least about 18 hours, and more specifically for at least about 24 hours. In some embodiments, it may be particularly useful to perform heat treating for at least about 12 hours, specifically for at least about 18 hours, and more specifically for at least about 24 hours.

In some embodiments, it may be advantageous that bringing the skirt material 210 into contact with the first surface contour 222, 232 comprises pressing the skirt material 210 into contact with the first surface contour 222, 232 by an external force. In some embodiments, pressing the skirt material 210 into contact with the first surface contour 222 by an external force may comprise deforming the skirt material 210. The external force may be brought up in various ways. In some embodiments, it may be particularly advantageous that bringing up external force comprises one or more of:
  a) pressing a second mold 220, 230 against the first mold,
  b) arranging clamping elements around the string material 210 (for instance wrapping strings around the skirt material 210 or arranging compressive rings around the skirt material 210), and/or
  c) pushing the skirt material 210 into contact with the first surface contour 222, 232 using fluid pressure (for instance pneumatical and/or hydraulic forces).

First and Second Molds

In the following, various aspects of the method may be described which may account for embodiments of the method wherein a first and a second mold is used. It should be understood that some or all of these aspects may be combinable with each other and/or with any of the previously mentioned aspects (in particular the general aspects) and/or any of the following aspects (in particular aspects of the flat molds and/or aspects of the cylindrical molds).

Figure 12:
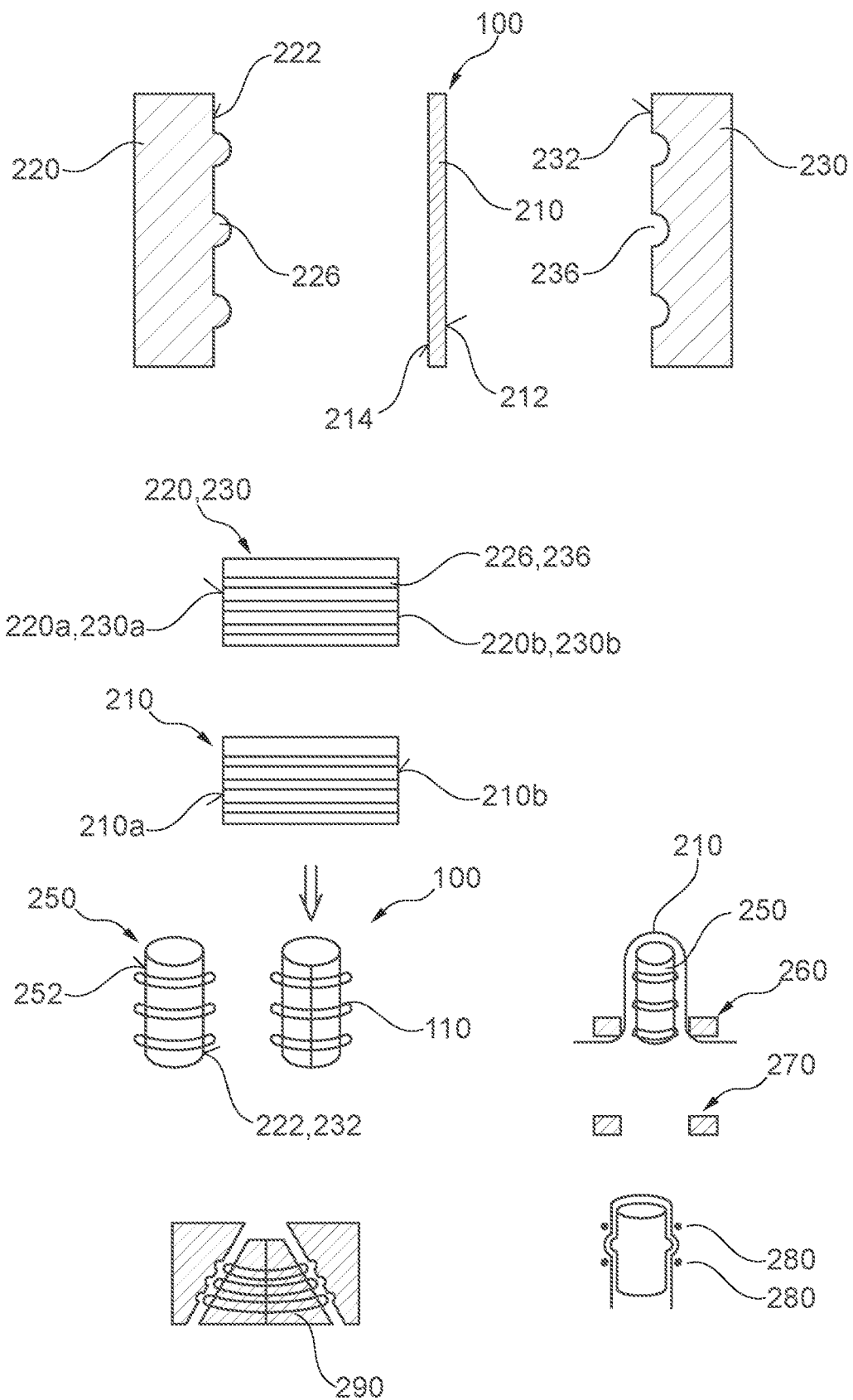
FIG. 12 is a schematic drawing illustrating various aspects of the method.
Figure 13:
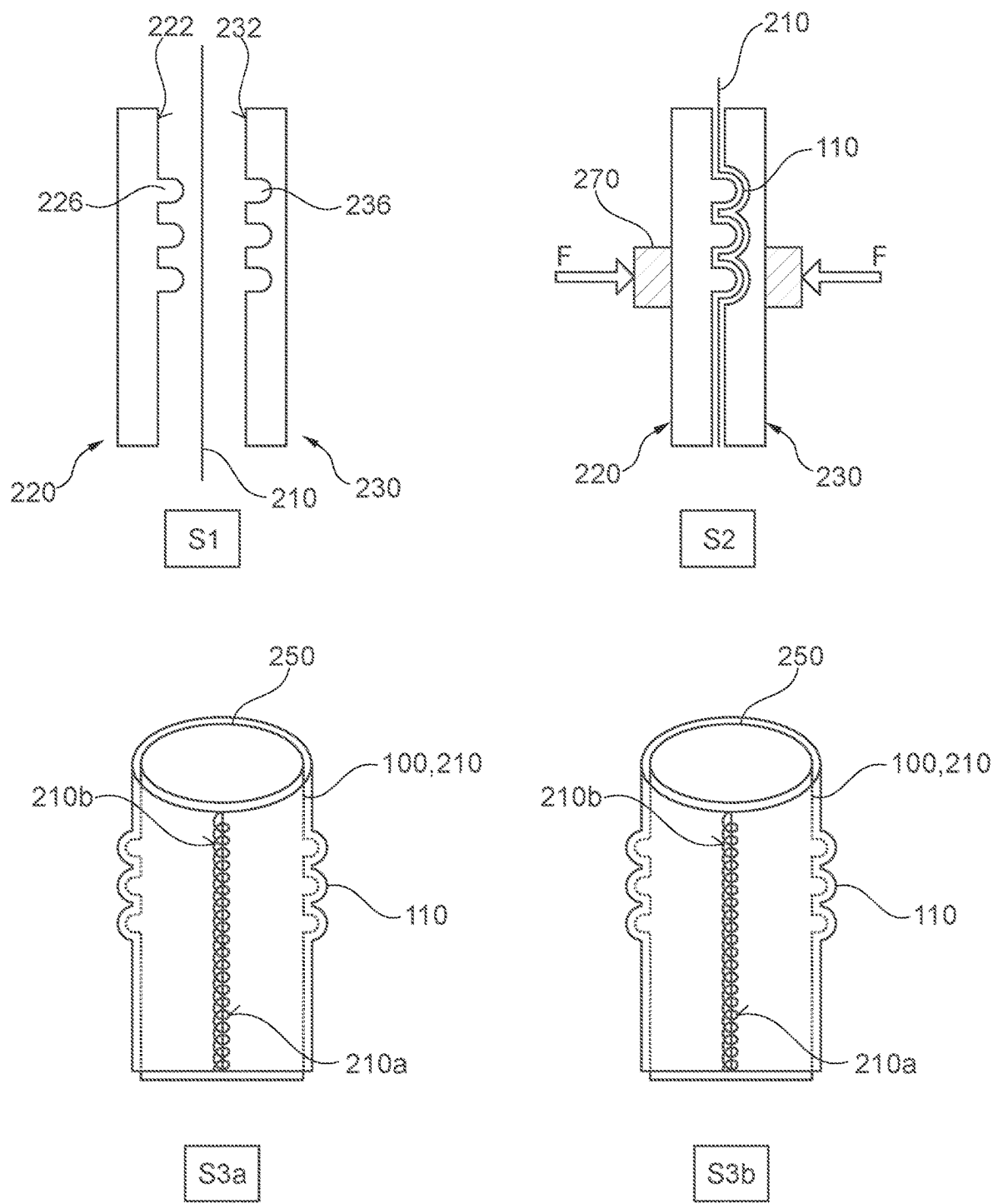
FIG. 13 is a schematic drawing illustrating various aspects of the method using flat molds.
Figure 14:
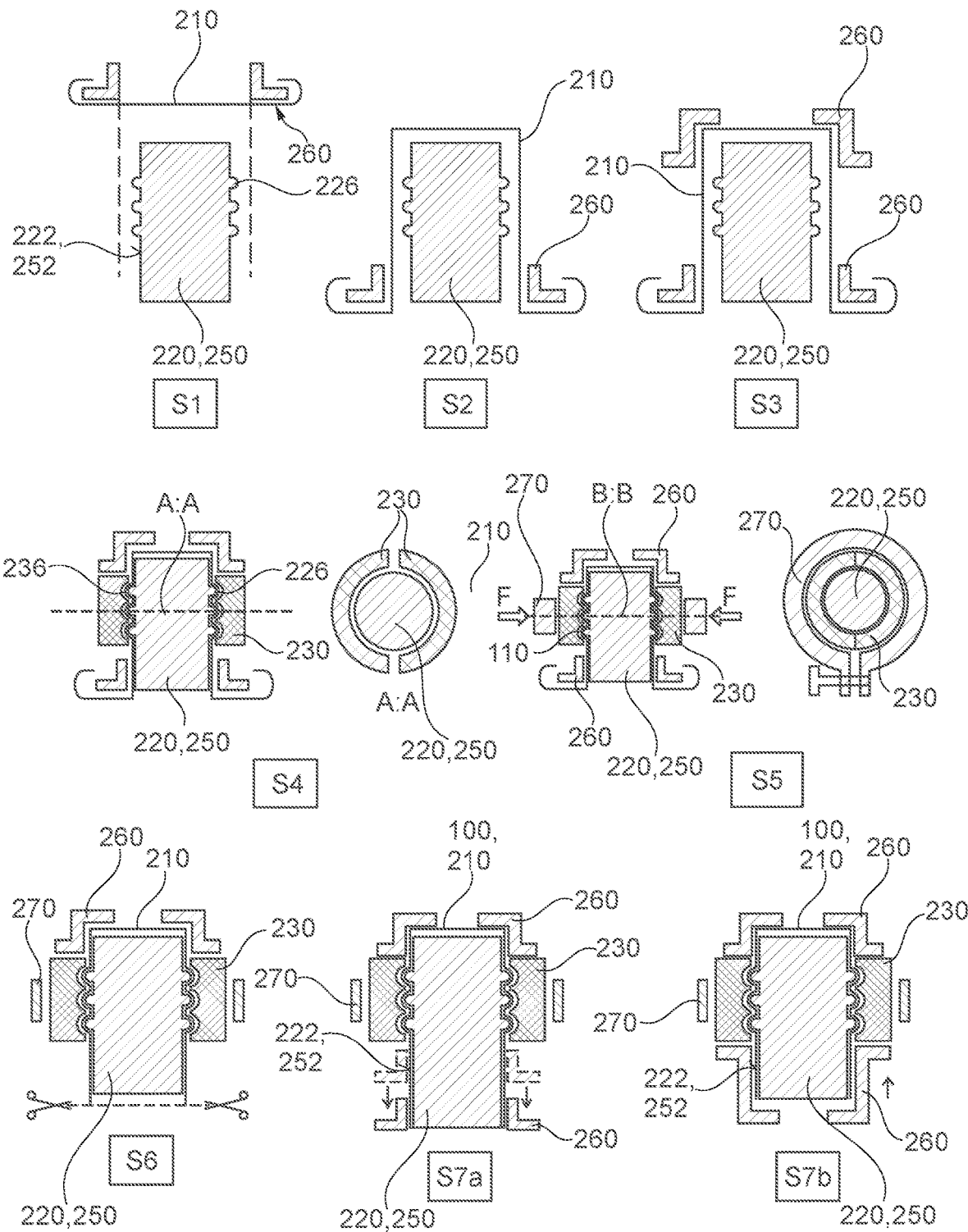
FIG. 14 is a schematic drawing illustrating various aspects of the method using cylindrical molds.

In some embodiments, the external force may be brought up by pressing a second mold 220, 230 against the first mold 220, 230 (see, for instance FIGS. 12 to 14). In some embodiments, it may be particularly useful that the second mold 220, 230 has a second surface contour 222, 232 shaped as a negative to the first surface contour 222, 232 of the first mold 220, 230. In some embodiments, the first mold 220, 230 may be a male mold 220. The male mold 220 may have the one or more protrusions 226 in its first surface contour 222 which form the one or more bulges 110 in the skirt material 210. Additionally, the second mold 220, 230 may be a female mold 230. The second mold 230 may have the one or more recesses 236 in its second surface contour 232. The one or more recesses 236 may be formed as a negative to the one or protrusions 226. In alternative embodiments, the first mold 220, 230 may be a female mold 230. Additionally, the second mold 220, 230 may be a male mold 220. It should be understood that the features described hereinabove concerning the male and female molds may also apply to this alternative embodiment, analogously.

In some embodiments, both, the first mold and the second mold may comprise one or more recesses and one or more protrusions. The protrusions and recesses in the first mold may match, i.e. be shaped as a negative to the respective recesses and protrusions in the second mold.

In some embodiments, which comprise a first mold 220, 230 and a second mold 220, 230, it should be understood that the first and second molds 220, 230 may be pressed together with their surface contours 222, 232 facing at each other. In other words, the first and second molds 220, 230 may be pressed together such that their surface contours 222, 232 engage each other. In some embodiments, the first and second molds 220, 230 may be pressed together with the skirt material 210 being arranged in between.

Flat Molds

In the following, various aspects of the method may be described which may account for embodiments of the method wherein the first and second molds are flat molds. It should be understood that some or all of these aspects may be combinable with each other and/or with any of the previously mentioned aspects (in particular the general aspects and/or the aspects of the first and second molds) and/or any of the following aspects (in particular the aspects of the materials).

In some embodiments, the first and second molds 220, 230 may be flat molds (see, for instance FIGS. 12 and 13). In some embodiments, the expression "flat mold" can mean that the molds are generally plate-shaped or generally wall-shaped. Alternatively or additionally, a flat mold may be basically a flat plate except for the protrusions and/or recesses. Alternatively or additionally, a flat mold may be shaped as a rectangular plate. Alternatively or additionally the first and second molds 220, 230 may have a first side edge 220a, 230a and/or a second side edge 220b, 230b. In some embodiments, the skirt material 210 may be a sheet material which is pressed between the first and second molds 220, 230 by a tightening device 270. In other words, the tightening device 270 may urge the first and second molds 220, 230 together such that the skirt material 210 is pressed into contact with the first and second surface contours 222, 232. Alternatively described, the tightening device 270 may press the first and second molds 220, 230 together such that the skirt material 210 may be deformed to include the one or more bulges 110. In some embodiments, at least one of the one or more protrusions 226 and/or at least one of the one or more recesses 236 may extend from a first side edge 220a, 230a to a second side edge 220b, 230b of the first and second molds 220, 230, respectively. Thereby at least one bulge 110 may be formed which extends from a first side edge 210a to a second side edge 210b of the skirt material 210. In some embodiments, the first mold 220 may have three protrusions 226 which may extend from a first side edge 220a to a second side edge 220b. Alternatively or additionally, the second mold 230 may have three recesses 236 which may extend from a first side edge 230a to a second side edge 230b. Thereby, three bulges 110 may be formed which extend from a first side edge 210a to a second side edge 210b of the skirt material 210. In some embodiments, only one, two or more than three bulges 110 may be formed analogously.

In some embodiments again with reference to FIGS. 12 and 13, the skirt material 210 may be crosslinked and/or heat treated in a sheet shape. Subsequently, it may be advantageous that fixing comprises bringing the skirt material 210 in a cylindrical shape and connecting two respective side edges 210a, 210b of the skirt material 210 to form the sealing skirt 100. If a bulge 110 extends from the first side edge 210a to the second side edge 210b of the skirt material 210, after bringing the skirt material in a cylindrical shape and connecting the respective side edges 210a, 210b, a circumferentially extending bulge 110 may be formed (see, steps S3a and S3b in FIG. 13). In other words, a bulge 110 may be formed in the skirt material 210 which is ring shaped and bulges radially outward. In some embodiments, after crosslinking and/or heat treating, the skirt material 210 may be released from the molds 220, 230. Additionally, specifically subsequently, the skirt material 210 may be brought in a cylindrical shape. Additionally, specifically subsequently, the skirt material 210 may be connected at the side edges 210a, 210b to form the sealing skirt 100 with the bulges 110 extending radially outward. In some embodiments, the skirt material 210 may be brought in the cylindrical shape by arranging it on a cylindrical holding mold 250. In this case the cylindrical holding mold 250 may be made from a soft material, e.g. silicone, or from a hard material, e.g. POM. In some embodiments, the cylindrical holding mold 250 may comprise a contour conforming to the shape of the desired sealing skirt 100. For instance the cylindrical holding mold may comprise circumferentially extending protrusions to form the bulges 110 in the skirt material 210, i.e. in the sealing skirt 100. In some embodiments, the side edges 210a, 210b of the skirt material 210 may be connected by suturing, adhesively attaching or joining. In some embodiments, adhesively attaching may comprise gluing. In some embodiments, joining may comprise welding. In some embodiments, crosslinking and/or heat treating may be performed for at least about 24 hours. Subsequently, the skirt material 210 may be brought in the cylindrical shape by arranging it on the cylindrical holding mold 250 and the side edges 210a, 210b of the skirt material 210 may be connected by, for instance by suturing, such that a sealing skirt 100 with three circumferentially extending bulges 110 may be fabricated (see, step S3a in FIG. 13). In other embodiments more or less than three bulges 110, for instance one, two, four, five or six bulges 110 may be formed in the skirt material 210. In some embodiments, crosslinking and/or heat treating of the skirt material 210 may be only partly performed in a sheet shape. For instance, crosslinking and/or heat treating of the skirt material 210 may be performed for at least about 2 hours with the skirt material 210 being pressed between the first and second molds 220, 230. Subsequently, the skirt material 210 may be brought in the cylindrical shape by arranging it on the cylindrical holding mold 250 and the side edges 210a, 210b of the skirt material 210 may be connected by, for instance by suturing. Subsequently, crosslinking and/or heat treating may be continued for at least about 6, specifically for at least about 10 and more specifically for at least about 22 hours such that a sealing skirt 100 with three circumferentially extending bulges 110 may be fabricated (see, step S3b in FIG. 13). In other embodiments more or less than three bulges 110, for instance one, two, four, five or six bulges 110 may be formed in the skirt material 210.

Cylindrical Molds

In the following, various aspects of the method may be described which may account for embodiments of the method wherein the first and second molds are cylindrical molds. It should be understood that some or all of these aspects may be combinable with each other and/or with any of the previously mentioned aspects (in particular the general aspects and/or the aspects of the first and second molds) and/or any of the following aspects (in particular the aspects of the materials).

In some embodiments, the first mold 220, 230 may be a cylindrical holding mold 250 (see, for instance FIGS. 12 and 14). In some embodiments, it may be advantageous that the first surface contour 222, 232 extends on an outer shell surface 252 of the first mold 220, 230, in particular of the cylindrical holding mold 250 (see, step S1 in FIG. 14). The skirt material 210 may be a sheet material which is pulled over the first mold 220, 230 to cover the outer shell surface 252 (see, step S2 in FIG. 14). In this embodiment, it may be particularly useful that the cylindrical holding mold 250 is made from a hard material, e.g. POM. Thereby, better shaping results may be achieved. Alternatively, the cylindrical holding mold 250 may be made from soft material, e.g. silicone. In some embodiments, the skirt material 210 may be pulled over the first mold 220, 230 by an outer holding mold 260. Alternatively or additionally, it may be further advantageous that the skirt material 210 is held in a position covering the outer shell surface 252 by an outer holding mold 260. In some embodiments, the outer holding mold 260 may be ring shaped. In some embodiments, the outer holding mold 260 may be made from a soft material, specifically from silicone. In some embodiments, two outer holding molds 160 may be provided. One outer holding mold 260 may be provided to hold the skirt material 210 in contact with an upper portion of the cylindrical holding mold 250. Another holding mold may be provided to hold the skirt material 210 in contact with a lower portion of the cylindrical holding mold 250 (see, step S3 in FIG. 14). The first mold 220, 230 or cylindrical holding mold 250 may also be referred to as inner mold 250 or inner holding mold 250. The outer holding mold 260 may also be referred to as holding ring 260.

In some embodiments again with reference to FIGS. 12 and 14, the second mold 220, 230 may be shaped as hollow cylinder. The second mold 220, 230 may be pressed circumferentially on the first mold 220, 230. The first and second molds 220, 230 may be pressed together such that the skirt material 210 may be deformed to include the one or more bulges 110. Additionally, second mold 220, 230 may be pressed circumferentially around the first mold by a tightening device 270. Pressing the second mold 220, 230 circumferentially around the first mold may be performed after pulling the skirt material 210 over the first mold 220, 230 and/or after holding the skirt material 210 in a position covering the outer shell surface 252. In some embodiments, the second mold 220, 230 may comprise two halves of a hollow cylinder (see, step S4 in FIG. 14). The two halves may be pressed together by the tightening device 270. In some embodiments, the tightening device 270 may comprise a band clip which is attached around an exterior of the second mold 220, 230 and which urges the second mold 220, 230 radially inwardly (see, step S5 in FIG. 14). Alternatively or additionally, screws may be used to press the two halves together. In some embodiments, after pressing the second mold 220, 230 around the first mold 220, 230, the skirt material 210 may be held in contact at an upper portion and/or at a lower portion of the first mold 220, 230. This may lead to a better alignment of the skirt material 210, in particular, for subsequent crosslinking and/or heat treating. In some embodiments, it may be advantageous, to remove, specifically cut off an excess portion of the skirt material 210 extending freely below the first mold 220, 230, before crosslinking and/or heat treating (see, step S6 in FIG. 14). Alternatively or additionally, removing, specifically cutting off, an excess portion of the skirt material 210 extending freely below the first mold 220, 230 may be performed after pressing the second mold 220, 230 circumferentially around the first mold 220, 230. In some embodiments, at least one of the one or more protrusions 226 and/or at least one of the one or more recesses 236 may extend circumferentially, in particular continuously circumferentially, along the first and second molds 220, 230, respectively. Thereby, at least one bulge 110 may be formed in the skirt material 210 which is ring shaped and bulges radially outward.

As explained further above, in some embodiments the first mold 220, 230 may be a male mold 220. In other words, the cylindrical holding mold 250 may be a male mold 220 (see, for instance FIGS. 12 and 14). That means, the cylindrical holding mold 250 may comprises one or more protrusions 226 in its first surface contour 222. In some embodiments the cylindrical holding mold 250 may comprise three protrusions 226 extending circumferentially around the outer shell surface 252 of the cylindrical holding mold 250 (see, step S1 in FIG. 14). The protrusions 226 may extend around the outer shell surface 252 of the cylindrical holding mold 250 to form a closed loop or a ring. The second mold 220, 230 may be a female mold 230 having three recesses 236 arranged on its inner shell surface which are formed as a negative to the protrusions 226 of the first mold 220, 250 (see, step S4 in FIG. 14). By pressing the first mold 220, 250 and the second mold 230 together with the skirt material 210 in between, three bulges 110 may be formed in the skirt material 210 which extend circumferentially around the skirt material 210 and which protrude radially outward (see, step S5 in FIG. 14). Crosslinking and/or heat treating may be performed with the holding molds 260 keeping the skirt material 210 in close contact, i.e. alignment, with the first surface contour 222 (see, steps S7a and S7b in FIG. 14). After crosslinking and/or heat treating the skirt material 210 may be removed from the molds 220, 230. Thereby a sealing skirt 100 with three circumferentially extending bulges 110 may be fabricated. In other embodiments more or less than three bulges 110, for instance one, two, four, five or six bulges 110 may be formed in the skirt material 210.

Clamping Elements

In the following, various aspects of the method may be described which may account for embodiments of the method wherein only a first mold is used together with clamping elements. It should be understood that some or all of these aspects may be combinable with each other and/or with any of the previously mentioned aspects (in particular the general aspects) and/or any of the following aspects (in particular the aspects of the materials).

Figure 15:
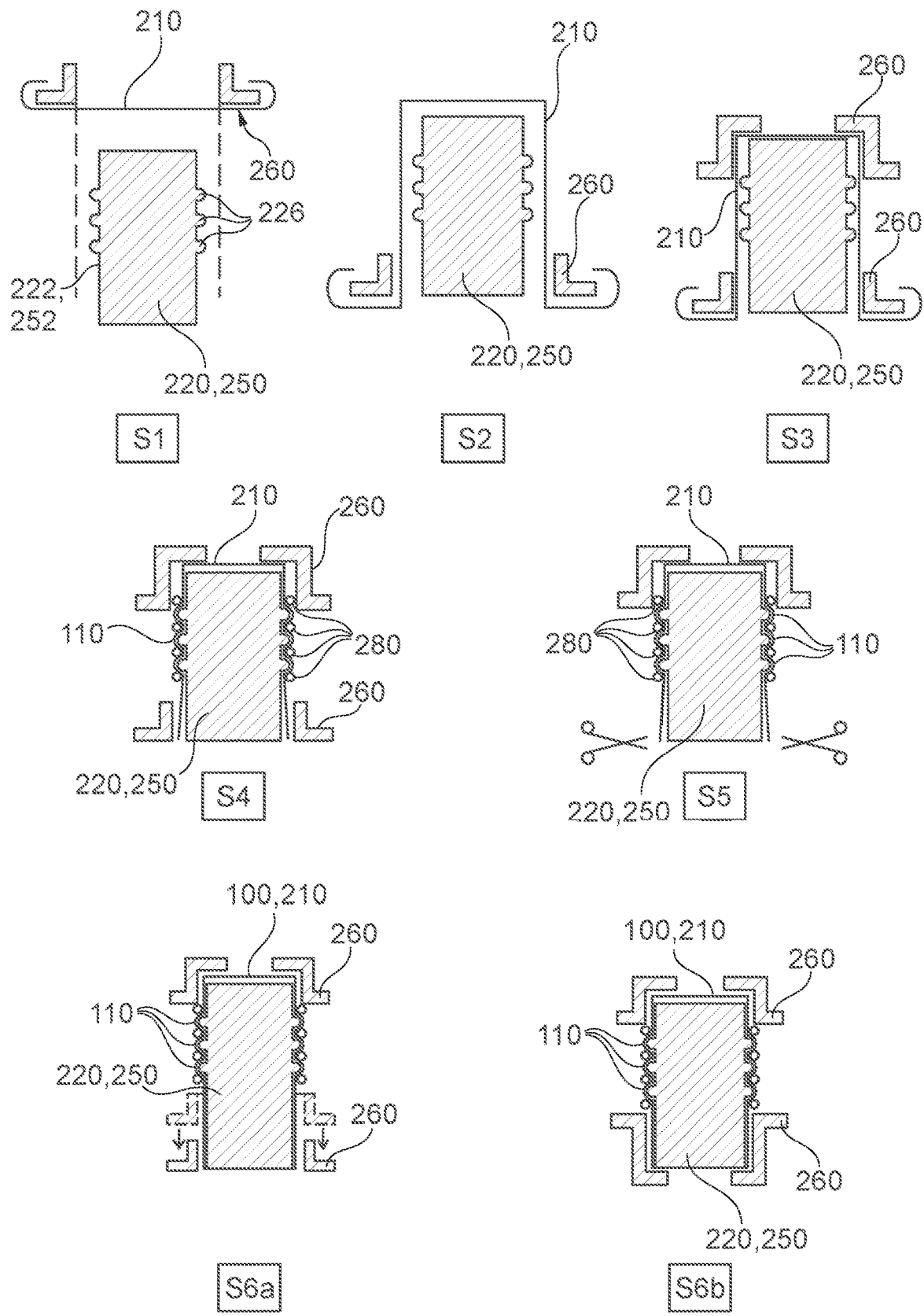
FIG. 15 is a schematic drawing illustrating various aspects of the method using clamping elements.

In some embodiments, the external force may be brought up by arranging clamping elements 280 on an exterior of the skirt material 210 (see, for instance FIGS. 12 and 15). In some embodiments, the first mold 220, 230 may be a cylindrical holding mold 250 (see, step S1 in FIG. 15). The cylindrical holding mold 250 may be the same cylindrical holding mold 250 as described with respect to FIG. 14. In other words the cylindrical holding mold 250 may comprise one or more features of cylindrical holding mold 250 as described with respect to FIG. 14. In this embodiment, it may be particularly useful that the cylindrical holding mold 250 is made from a hard material, e.g. POM. Thereby, better shaping results may be achieved. Alternatively, the cylindrical holding mold 250 may be made from soft material, e.g. silicone. In some embodiments, it may be advantageous that the first surface contour 222, 232 extends on an outer shell surface 252 of the first mold 220, 230. It may be further advantageous that the first mold 220, 230 or cylindrical holding mold 250 is a male mold 220 having the one or more protrusions 226 (see, step S1 in FIG. 15). Alternatively or additionally, the skirt material 210 may be a sheet material. The sheet material may be pulled over the first mold 220, 230 to cover the outer shell surface 252. In some embodiments, the skirt material 210 may be pulled over the first mold 220, 230 by an outer holding mold 260 (see, step S2 in FIG. 15). Alternatively or additionally, it may be further advantageous that the skirt material 210 is held in a position covering the outer shell surface 252 by an outer holding mold 260. In some embodiments, the outer holding mold 260 may be ring shaped. In some embodiments, the outer holding mold 260 may be made from a soft material, specifically from silicone. In some embodiments, two outer holding molds 160 may be provided. One outer holding mold 260 may be provided to hold the skirt material 210 in contact with an upper portion of the cylindrical holding mold 250. Another holding mold may be provided to hold the skirt material 210 in contact with a lower portion of the cylindrical holding mold 250 (see, step S3 in FIG. 15). The first mold 220, 230 or cylindrical holding mold 250 may also be referred to as inner mold 250 or inner holding mold 250. The outer holding mold 260 may also be referred to holding ring 260.

As explained further above, in some embodiments the first mold 220, 230 may be a male mold 220. In other words, the cylindrical holding mold 250 may be a male mold 220 (see, for instance FIGS. 12 and 15). That means, the cylindrical holding mold 250 may comprises one or more protrusions 226 in its first surface contour 222. At least one of the one or more protrusions 226 may extend circumferentially along the first mold 220, 230 such that at least one bulge 110 is formed in the skirt material 210 which is ring shaped and which bulges radially outward. In some embodiments, it may be advantageous that three axially distanced protrusions 226 extend circumferentially along the first mold 220, 230 such that three axially distanced bulges 110 may be formed in the skirt material 210. In some embodiments, it may be advantageous that after pulling the skirt material 210 over the first mold 220, 230, the external force is brought up by arranging clamping elements 280 on an exterior of the skirt material 210 (see, step S4 in FIG. 15). It may be further advantageous that two clamping elements 280 are arranged directly axially adjacent of a respective bulge 110 on both sides (see, step S5 in FIG. 15). In some embodiments, the clamping elements 280 may be compressive rings. Alternatively or additionally, arranging clamping elements 280 on an exterior of the skirt material 210 may comprise wrapping strings directly axially adjacent of a respective bulge 110 on both sides around the circumference of the skirt material 210. The strings may be wrapped such that the skirt material 210 is radially compressed or pressed radially inwardly directly axially adjacent of a respective bulge 110 on both sides and/or in between two adjacent bulges 110. In some embodiments, after arranging the clamping elements 280, the skirt material 210 may be held in contact at an upper portion and/or at a lower portion of the first mold 220, 230 (see, steps S0a and S6b in FIG. 15). In some embodiments, the previously mentioned one or two outer holding molds 260 may be used to hold the skirt material 210 in contact with the cylindrical holding mold 250 at an upper portion and/or a lower portion thereof.

In some embodiments, it may be advantageous, to remove, specifically cut off an excess portion of the skirt material 210 extending freely below the first mold 220, 230, before crosslinking and/or heat treating (see, step S5 in FIG. 15). Alternatively or additionally, removing, specifically cutting off, an excess portion of the skirt material 210 extending freely below the first mold 220, 230 may be performed after arranging clamping elements 280 on an exterior of the skirt material 210.

In some embodiments the cylindrical holding mold 250 may comprise three protrusions 226 extending circumferentially around the outer shell surface 252 of the cylindrical holding mold 250. The protrusions 226 may extend around the outer shell surface 252 of the cylindrical holding mold 250 to form a closed loop or a ring. Thereby, after pressing the skirt material 210 into contact with the first surface contour 222, the skirt material 210 may be deformed such that the one or more bulges 110 may be provided in the skirt material 210. After crosslinking and/or heat treating the skirt material 210 may be removed from the molds 220, 250, 260 and the clamping elements 280 may be removed such that a sealing skirt 100 is provided.

Fluid Pressure

In the following, various aspects of the method may be described which may account for embodiments of the method wherein only a first mold is used together with fluid pressure. It should be understood that some or all of these aspects may be combinable with each other and/or with any of the previously mentioned aspects (in particular the general aspects) and/or any of the following aspects (in particular the aspects of the materials).

In some embodiments, the external force may be brought up by applying fluid pressure to an interior of the skirt material 210 (see, for instance FIGS. 12 and 16). In some embodiments, the skirt material 210 may be tightly pulled over a conical holding mold 290. Then the conical holding mold 290 may be inserted into a correspondingly frustoconically formed hole of the first mold 220, 230 to bring the skirt material 210 into contact with the first surface contour 222, 232 of the first mold 220, 230. The first mold 220, 230 may be a female mold 230 having one or recesses 236 arranged in its first surface contour 232. Alternatively or additionally, the first mold 230 may have a hollow cylindrical shape. Alternatively or additionally, the first mold 220, 230 may have a frustoconically formed hole with an inner shell surface which forms the first surface contour 232 Alternatively or additionally, the skirt material 210 may be pressed radially outward into one or more recesses 236 arranged in the first surface contour 232 by fluid pressure to form one or more bulges 110 in the skirt material 210. In some embodiments, it may be advantageous to maintain the fluid pressure during crosslinking and/or heat treating. Alternatively or additionally, the fluid pressure may be a positive pressure provided through supply channels within the conical holding mold 290. Alternatively or additionally, the supply channels may be arranged such that fluid pressure is provided to the skirt material 210 in areas of surrounding recesses 236. Alternatively or additionally, the fluid pressure may involve pneumatical and/or hydraulic forces. In some embodiments, it may be advantageous that the fluid pressure involves pneumatical forces, for instance positive air pressure.

In some embodiments, the conical holding mold 290 may not be conical but a cylindrical holding mold 290. In that case, the first mold 220, 230 may have a hollow cylindrical shape with a cylindrical hole. The cylindrical holding mold 290 may have an outer diameter which is smaller than an inner diameter of the cylindrical hole. The difference between the diameters may equal about twice the thickness of the skirt material 210. The first mold 220, 230 may be a female mold 230 having one or recesses 236 arranged in its first surface contour 232. Alternatively or additionally, the cylindrical hole of the first mold 230 may have an inner shell surface which forms the first surface contour 232. Alternatively or additionally, the skirt material 210 may be pressed radially outward into one or more recesses 236 arranged in the first surface contour 232 by fluid pressure to form one or more bulges 110 in the skirt material 210. In some embodiments, it may be advantageous to maintain the fluid pressure during crosslinking and/or heat treating. Alternatively or additionally, the fluid pressure may be a positive pressure provided through supply channels within the conical holding mold 290. Alternatively or additionally, the supply channels may be arranged such that fluid pressure is provided to the skirt material 210 in areas of surrounding recesses 236. Alternatively or additionally, the fluid pressure may involve pneumatical and/or hydraulic forces. In some embodiments, it may be advantageous that the fluid pressure involves pneumatical forces, for instance positive air pressure.

Materials

In the following, various aspects of the method may be described concerning the skirt material and materials of the molds. It should be understood that some or all of these aspects may be combinable with each other and/or with any of the previously mentioned aspects (in particular general aspects and/or aspects of the flat molds and/or aspects of the cylindrical molds and/or the aspects of the first and second molds and/or aspects of the clamping elements and/or aspects of the fluid pressure and/or aspects of the materials).

In some embodiments, the skirt material 210 may be a sheet material having a first surface 212 and a second surface 214. Alternatively or additionally, the first surface 212 may be a smooth surface. Alternatively or additionally, the second surface 214 may be a fibrous surface. In some embodiments, it may advantageous that the second surface of the skirt material 210 is brought into contact with the first surface contour 222, 232. In other words, the skirt material 210 may be used such that the smooth surface is provided on an outer side of the bulges 110. In some embodiments, the skirt material 210 may be formed of a crosslinkable polymer, for instance PU. In some embodiments, it may be advantageous to use crosslinking for fixing the pre-determined shape in the skirt material comprising crosslinkable polymer. In some embodiments, the skirt material 210 may be formed of a biological material, for instance pericardial tissue, specifically bovine pericardial tissue, porcine pericardial tissue or ovine pericardial tissue. In some embodiments, it may be advantageous to chemically crosslink, in particular to tan, the biological material for fixing the pre-determined shape in the skirt material 210.

In some embodiments, the first mold 220, 220 may be made from a material selected from: silicone, POM, or any other suitable material. In some embodiments, the second mold 220, 230 may be made from a material selected from: silicone, POM, or any other suitable material.

In some embodiments, the sealing skirt (100) may be configured for reduction or prevention of paravalvular leakage.

In a third aspect, the present disclosure relates to a cardiac stent-valve comprising a sealing skirt that may i.a. be produced by the method for fabricating a sealing skirt according to the second aspect of the present disclosure. However, it should be understood that the skirt may also be prepared by any other suitable method.

Accordingly, the third aspect of the present disclosure relates to a cardiac stent-valve (10) for transcatheter delivery. The stent-valve (10) may be compressible to a compressed state for delivery and expandable to an expanded state for implantation. The stent-valve (10) may comprise a stent (20) with an axial inflow end (20a) and an axial outflow end (20b) and a plurality of leaflets (14) arranged within the stent (20). The stent-valve (10) may comprise a sealing skirt (100) for reduction or prevention of paravalvular leakage. The sealing skirt (100) may comprise, in the expanded state, one or more bulges (110) which are extending radially outward from the sealing skirt (100). The one or more bulges (110) may be pre-formed in the sealing skirt (100).

In some embodiments, a pre-determined shape comprising the one or more bulges (110) may be imparted to sealing skirt (100), followed by fixation of the pre-determined shape. In some embodiments, it may be particularly advantageous that the fixation involves chemically or physically crosslinking a crosslinkable material in the sealing skirt (100) or subjecting the pre-determined shape of the sealing skirt (100) to an annealing heat treatment.

In some embodiments, the sealing skirt (100) may be a unitary body comprising at least one of the one or more pre-formed bulges (110).

In some embodiments, the one or more pre-formed bulges (110) may be provided with a shape-memory which facilitates return of compressed bulges (110) to their pre-formed shape upon expansion of the cardiac stent valve (10).

In some embodiments, the sealing skirt (100) comprises a crosslinkable polymer, in particular a polyurethane, or a biological material, in particular pericardial tissue, specifically bovine pericardial tissue, porcine pericardial tissue or ovine pericardial tissue.

The embodiments recited for the above third aspect of the disclosure are equally combinable with the aforementioned first and second aspect of the disclosure.

REFERENCE SIGN LIST

10 stent-valve
14 leaflets
14a valve inflow end
14b valve outflow end
16 native leaflet portion
18 native valve annulus portion
20 stent
20a axial inflow end
20b axial outflow end
21 commissural supports
22 stabilization arches
26 lower tubular portion
26a lower stent apexes
26b upper stent apexes
28 upper crown portion
30 inner skirt
40 outer skirt
40a first outer skirt end
40b second outer skirt end 42 first outer skirt portion
44 second outer skirt portion
100 sealing skirt
110 bulge
112 upper axial level
113 thickness
114 lower axial level
115 depth
116 upper apex
118 lower apex
120 tubular portion
130 inner tubular wall
140 outer wall
140a first axial end
140b second axial end
141 axial length
142 free circumferential edge
144 attachment portion
150 pocket
152 first pocket section
154 second pocket sections
156 annular opening
158 control attachments
210 skirt material
210a first side edge
210b second side edge
212 first surface
214 second surface
220 male mold
220a first side edge of male mold
220b second side edge of male mold
222 surface contour of male mold
226 protrusion
230 female mold
230a first side edge of female mold
230b second side edge of female mold
232 surface contour of female mold
236 recess
250 cylindrical holding mold
252 outer shell surface
260 outer holding mold
270 tightening device
280 clamping element
290 conical holding mold It should be understood that the present disclosure can also (alternatively) be defined in accordance with the following configurations:

1. A cardiac stent-valve (10) for transcatheter delivery, the stent-valve (10) being compressible to a compressed state for delivery, and expandable to an expanded state for implantation, the stent-valve (10) comprising:
   a stent (20) with an axial inflow end (20a) and an axial outflow end (20b),
   a plurality of leaflets (14) arranged within the stent (20), and
   a sealing skirt (100) for reduction or prevention of paravalvular leakage;
   wherein, in the expanded state, the sealing skirt (100) comprises a tubular inner wall (130) and at least one pocket (150) which is positioned on the tubular inner wall (130) and comprises an outer wall (140) which extends radially outward from the tubular inner wall (130);
   wherein the pocket (150) is configured to be distended radially outward in response to inflow of blood in the expanded state; and
   wherein, in the expanded state, the outer wall (140) of the pocket (150) comprises one or more pre-shaped bulges (110) which extend radially outward from the outer wall (140) of the pocket (150).

2. The cardiac stent-valve (10) of configuration 1, wherein the one or more pre-shaped bulges (110) are preformed in the outer wall (140) of the pocket (150), in particular, wherein the one or more pre-shaped bulges (110) are preformed in the outer wall (140) of the pocket (150) by imparting a pre-determined shape to the outer wall (140), followed by fixation of the pre-determined shape.

3. The cardiac stent-valve (10) of configuration 2, wherein the fixation involves chemically or physically crosslinking a crosslinkable material in the outer wall (140) of the pocket (150) or subjecting the pre-determined shape of the outer wall (140) of the pocket (150) to an annealing heat treatment.

4. The cardiac stent-valve (10) of any one of the preceding configurations, wherein the one or more pre-shaped bulges (110) comprise or consist of a shape-memory material.

5. The cardiac stent-valve (10) of any one of the preceding configurations, in particular configuration 4, wherein the one or more pre-shaped bulges (110) are configured to assume a pre-determined shape in the expanded state.

6. The cardiac stent-valve (10) of any one of the preceding configurations, in particular configuration 4 or 5, wherein the outer wall 140 and the one or more pre-shaped bulges (110) form a unitary body.

7. The cardiac stent-valve (10) of any one of the preceding configurations, wherein the outer wall (140) of the pocket (150) and the one or more pre-shaped bulges (110) comprise the same material, in particular wherein the outer wall (140) of pocket (150) and the one or more pre-shaped bulges (110) of pocket (150) are made of the same material.

8. The cardiac stent-valve (10) of any one of the preceding configurations, wherein, in the expanded state, the one or more pre-shaped bulges (110) are configured to be able to extend radially outward independently of the pocket (150) being able to distend radially outward.

9. The cardiac stent-valve (10) of any one of the preceding configurations, wherein the outer wall (140) comprises a generally tubular portion (120), and wherein the one or more pre-shaped bulges (110) are formed in the generally tubular portion (120).

10. The cardiac stent-valve (10) of any one of the preceding configurations, wherein the outer wall (140) is formed as a sheet and folded in a generally tubular form.

11. The cardiac stent-valve (10) of any one of configurations 9 or 10, wherein, in the expanded state, the generally tubular portion (120) is distensible radially outward, optionally, to form a first pocket section (152).

12. The cardiac stent-valve (10) of any one of configurations 9 to 11, wherein, in the expanded state, each of the one or more pre-shaped bulges (110) is distensible radially outward to extend further radially outward from the generally tubular portion (120), optionally, to form a respective second pocket section (154).

13. The cardiac stent-valve (10) of configurations 11 and 12, wherein, in the expanded state, the first pocket section (152) is configured to be formed independently from any of the second pocket sections (154), in particular, wherein at least a portion of both or only one of, the first pocket section (152) and any one of the second pocket sections (154) may be formed in the expanded state.

14. The cardiac stent-valve (10) of any one of configurations 9 to 13, wherein, in the expanded state, the first pocket section (152) is configured to extend continuously or intermittently at least about an angle of about 180°, specifically at least about an angle of about 270°, more specifically at least about an angle of about 360° along a circumference of the outer wall (140), and in particular, wherein the first pocket section (152) is configured to form an annular pocket in the expanded state.

15. The cardiac stent-valve (10) of any one of the preceding configurations, wherein the one or more pre-shaped bulges (110) are preformed in the outer wall (140) in a predetermined pattern.

16. The cardiac stent-valve (10) of any one of the preceding configurations, wherein, in the expanded state, at least one of the one or more pre-shaped bulges (110) is configured to extend radially outward continuously or intermittently at least about an angle of about 180°, specifically at least about an angle of about 270°, more specifically at least about an angle of about 360° along a circumference of the outer wall (140).

17. The cardiac stent-valve (10) of any one of the preceding configurations, wherein, in the expanded state, at least one of the one or more pre-shaped bulges (110) is configured to extend radially outward along a circumference of the outer wall (140) in a circumferential direction of the outer wall (140), specifically continuously about an angle of about 360° of the circumference of the outer wall (140).

18. The cardiac stent-valve (10) of any one of the preceding configurations, wherein, in the expanded state, at least one of the one or more pre-shaped bulges (110) is configured to extend radially outward along a circumference of the outer wall (140) in a direction inclined with respect to a circumferential direction of the outer wall (140).

19. The cardiac stent-valve (10) of any one of the preceding configurations, wherein, in the expanded state, at least one of the one or more pre-shaped bulges (110) is configured to extend radially outward along a circumference of the outer wall (140) in a meandering shape, for instance, a zig-zag-shape, a wave-shape or sinuous shape.

20. The cardiac stent-valve (10) of configuration 19, wherein the stent (20) comprises a lattice structure of cells defined by interconnected struts, and wherein the meandering shape of the at least one of the one or more pre-shaped bulges (110) generally follows a shape defined by respective underlying struts.

21. The cardiac stent-valve (10) of any one of the preceding configurations, wherein the shape of at least one of the one or more pre-shaped bulges (110) is configured such that, in the expanded state, at each axial level of the outer wall (140), the fraction of a circumference of the outer wall (140) occupied the one or more pre-shaped bulges (110) is less than about 100%, optionally less than about 90%, optionally less than about 80%, optionally less than about 70%.

22. The cardiac stent-valve (10) of any one of the preceding configurations, wherein, in the expanded state, a thickness (113) and/or a depth (115) of at least one of the one or more pre-shaped bulges (110) may vary in a circumferential direction and/or in an axial direction of the outer wall (140).

23. The cardiac stent-valve (10) of any one of the preceding configurations, wherein, in the expanded state, the outer wall (140) comprises a plurality of pre-shaped bulges (110) which are axially and/or circumferentially distanced from each other.

24. The cardiac stent-valve (10) of configurations 17 and 23, wherein, in the expanded state, the outer wall (140) comprises two, three, four, five or more pre-shaped bulges (110) which are axially distanced from each other.

25. The cardiac stent-valve (10) of any one of the preceding configurations, wherein, at least in the expanded state, the pocket (150) has an opening (156) facing in the antegrade direction towards the axial outflow end (20*b*), in particular, wherein the opening (156) has an annular shape formed between the inner tubular wall (130) and the outer wall (140).

26. The cardiac stent-valve (10) of any one of the preceding configurations, wherein the outer wall (140) has a first axial end (140*a*) arranged towards the axial inflow end (20*a*) and a second axial end (140*b*) arranged towards the axial outflow end (20*b*).

27. The cardiac stent-valve (10) of configuration 26, wherein the outer wall (140) is attached to the stent (20) and/or the inner tubular wall (130) via an attachment portion (144) at the first axial end (140*a*) to form a bottom of the pocket (150) conjointly with the inner tubular wall (130).

28. The cardiac stent-valve (10) of configuration 27, wherein the attachment portion (144) is arranged at an axial position of the stent (20) between the axial inflow end (20*a*) and an upper crown (28) of the stent (20).

29. The cardiac stent-valve (10) of any one of configurations 26 to 28, wherein the outer wall (140) has a free circumferential edge (142) at the second axial end (40*b*) being directed to the axial outflow end (20*b*) and, at least in the expanded state, forming an opening (156) of the pocket (150) conjointly with the inner wall (30).

30. The cardiac stent-valve (10) of configuration 29, wherein the free circumferential edge (142) is arranged at an axial position of the stent (20) between the axial inflow end (20*a*) and an upper crown (28) of the stent (20), in particular, if additionally dependent on any one of configurations 27 or 28, wherein the free circumferential edge (142) is arranged at an axial position of the stent (20) between the attachment portion (144) and an upper crown (28) of the stent (20).

31. The cardiac stent-valve (10) of any one of configurations 29 or 30, wherein, at least in the expanded state, the free circumferential edge (142) has a substantially straight edge.

32. The cardiac stent-valve (10) of any one of configurations 29 or 30, wherein, at least in the expanded state, the free circumferential edge (142) has a non-straight edge, for instance, an undulating shape, or castellated shape, or notched shape.

33. The cardiac stent-valve (10) of configuration 32, wherein the non-straight edge aligns with apexes of an upper crown (28) of the stent (20).

34. The cardiac stent-valve (10) of any one of the preceding configurations, wherein, the outer wall (140) is a tubular wall such that, at least in the expanded state, the pocket (150) is configured to assume the shape of an annular pocket formed between the inner tubular wall (130) and the outer wall (140).

35. The cardiac stent-valve (10) of any one of the preceding configurations, wherein the sealing skirt (100) is attached to the stent (20) on an interior of the stent (20), and wherein the sealing skirt (100) is everted around the axial inflow end (20*a*) such that a portion of the sealing skirt (150) being on the interior of the stent (20) forms the inner tubular wall (130), and a portion of the sealing skirt (150) being everted and extending towards the axial outflow end (20*b*) forms the outer wall (140).

36. The cardiac stent-valve (10) of any one of the preceding configurations, wherein the inner wall (130) is an inner skirt (30) attached to the stent (20) on an interior of the stent (20), and wherein the outer wall (140) is at least a portion of an outer skirt (40) extending on the exterior of the stent (20), the outer skirt (40) having a first outer skirt end (40*a*) arranged towards the axial inflow end (20*a*) and a second outer skirt end (40*b*) arranged towards the axial outflow end (20*b*).

37. The cardiac stent-valve (10) of configuration 36, wherein the first outer skirt end (40*a*) is arranged towards the axial inflow end (20*a*) and wherein the second outer skirt end (40*b*) is arranged towards the axial outflow end (20*b*), and optionally, wherein the first outer skirt end (40*a*) is arranged at the axial inflow end (20*a*).

38. The cardiac stent-valve (10) of any one of configurations 36 or 37, wherein the outer wall (140) is a first outer skirt portion (42) of the outer skirt (40) and which extends from the second outer skirt end (40*b*) to an attachment portion (144).

39. The cardiac stent-valve (10) of any one of configurations 36 or 37, wherein the outer wall (140) is a first outer skirt portion (42) of the outer skirt (40) which is free to deploy relative to the stent (20) between the second outer skirt end (40*b*) and an attachment portion (144), optionally, wherein the outer skirt (40) is attached to the stent (20) and/or the inner skirt (30) via the attachment portion (144) to form a bottom of the pocket (150) conjointly with the inner skirt (30).

40. The cardiac stent-valve (10) of any one of configurations 38 or 39, wherein the outer skirt (40) comprises a second outer skirt portion (44) which extends from the attachment portion (144) to the first outer skirt end (40*a*).

41. The cardiac stent-valve (10) of any one of configurations 38 or 39, wherein the outer skirt (40) comprises a second outer skirt portion (44) which is attached to the stent (20) between the attachment portion (144) and the first outer skirt end (40*a*), optionally, wherein the outer skirt (40) is attached to the stent (20) and/or the inner skirt (30) via the attachment portion (144).

42. The cardiac stent-valve (10) of any one of configurations 40 or 41, wherein the second outer skirt portion (44) covers open cells of a lattice structure of the stent (20) between the attachment portion (144) and the axial inflow end (20*a*).

43. The cardiac stent-valve (10) of any one of the preceding configurations, wherein the inner tubular wall (130) is formed by a tubular inflow section of a valve component.

44. The cardiac stent-valve (10) of any one of the preceding configurations, wherein the outer wall (140) is formed by a tubular inflow section of a valve component.

46. The cardiac stent-valve (10) of configurations 43 and 44, wherein the tubular inflow section of the valve component extends to the axial inflow end (20*a*) and is everted around the axial inflow end (20*a*) such that a portion of the tubular inflow section being on the interior of the stent (20) forms the inner tubular wall (130), and a portion of the tubular inflow section being everted and extending towards the axial outflow end (20*b*) forms the outer wall (140).

47. The cardiac stent-valve (10) of configuration 43, wherein, in the expanded state, the valve component axially extends from a valve inflow end (14*a*) to a valve outflow end (14*b*), and wherein the outer wall (140) is attached to the stent (20) and/or the inner wall (130) via an attachment portion (144) to form a bottom of the pocket (150) conjointly with the valve component, and optionally, wherein the attachment portion (144) is arranged at an axial height of the valve inflow end (14*a*).

48. The cardiac stent-valve (10) of configuration 43, wherein, at least in the expanded state, a free circumferential edge (142) of the outer wall (140) is arranged at an axial height between the valve inflow end (14*a*) and the valve outflow end (14*b*).

49. The cardiac stent-valve (10) of any one of the preceding configurations, wherein, at least in the expanded state, a free circumferential edge (142) of the outer wall (140) is arranged at an axial height of an upper crown (28) of the stent (20), and optionally, wherein, in the expanded state, the upper crown (28) is configured to bias the free circumferential edge (142) radially outward.

50. The cardiac stent-valve (10) of any one of the preceding configurations, wherein, in the expanded state, the leaflets (14) axially extend from a valve inflow end (14*a*) to a valve outflow end (14*b*).

51. The cardiac stent-valve (10) of configuration 50, wherein the inner tubular wall (130) overlaps with an axial position of the valve inflow end (14*a*), and optionally, wherein the leaflets (14) are directly or indirectly attached to the inner tubular wall (130) at an axial position of the valve inflow end (14*a*).

52. The cardiac stent-valve (10) of any one of configurations 50 or 51, wherein, at least in the expanded state, the pocket (150) extends between the valve inflow end (14*a*) and the valve outflow end (14*b*).

53. The cardiac stent-valve (10) of any one of configurations 50 to 52, wherein, at least in the expanded state, at least a portion of the outer wall (140) extends between the valve inflow end (14*a*) and the valve outflow end (14*b*).

54. The cardiac stent-valve (10) of any one of configurations 50 to 53, wherein, at least in the expanded state, a free circumferential edge (142) of the outer wall (140) is arranged at an axial height between the valve inflow end (14*a*) and the valve outflow end (14*b*).

55. The cardiac stent-valve (10) of any one of configurations 50 to 54, wherein, at least in the expanded state, at least one of the one or more pre-shaped bulges (110) is arranged at an axial height between the valve inflow end (14*a*) and the valve outflow end (14*b*).

56. The cardiac stent-valve (10) of any one of configurations 50 to 55, wherein, at least in the expanded state, the outer wall (140) is attached to the stent (20) and/or the inner tubular wall (130) via an attachment portion (144) at a first axial end (140*a*) of the outer wall (140) to form a bottom of the pocket (150) conjointly with the inner tubular wall (130).

57. The cardiac stent-valve (10) of configuration 56, wherein, at least in the expanded state, the attachment portion (144) is arranged at an axial height between the valve inflow end (14*a*) and the valve outflow end (14*b*).

58. The cardiac stent-valve (10) of configuration 56, wherein, at least in the expanded state, the attachment portion (144) is arranged at an axial height between the valve inflow end (14*a*) and the axial inflow end (20*a*).

59. The cardiac stent-valve (10) of any one of the preceding configurations, wherein one or more control attachments (158) are formed between the between the outer wall (140) and the stent (20) and/or between the outer wall (140) and/or the inner tubular wall (130).

60. The cardiac stent-valve (10) of configuration 59, wherein the one or more control attachments (158) are configured to permit the outer wall (140) to distend substantially freely, while preventing everting of the outer wall (140).

61. The cardiac stent-valve (10) of any one of configurations 59 or 60, wherein at least one of the one or more control attachments (158) is arranged at a free circumferential edge (142) of the outer wall (140) or adjacent, in particular directly adjacent, to a free circumferential edge (142) of the outer wall (140) towards the axial inflow end (20a).

62. The cardiac stent-valve (10) of any one of configurations 59 to 61, wherein at least one of the one or more control attachments (158) is arranged at an axial height between a first axial end (140a) of the outer wall (140) and a second axial end (140b) of the outer wall (140).

63. The cardiac stent-valve (10) of any one of configurations 59 to 62, wherein a plurality of control attachments (158) is provided, wherein the control attachments (158) are distributed circumferentially, in particular, wherein the control attachments (158) are distributed equally or unequally spaced.

64. The cardiac stent-valve (10) of any one of configurations 59 to 63, wherein a plurality of control attachments (158) is provided, wherein some or all of the control attachments (158) may be arranged at different axial heights.

65. The cardiac stent-valve (10) of any one of the preceding configurations, wherein, in the expanded state, the one or more pre-shaped bulges (110) are configured to extend radially outward independently of a foreshortening of the stent (20) during expansion.

66. The cardiac stent-valve (10) of any one of the preceding configurations, wherein an axial length (141) of the outer wall (140) is substantially the same in the compressed state and in the expanded state.

67. The cardiac stent-valve (10) of configuration 66, wherein the axial length (141) of the outer wall (140) shortens less than about 30%, specifically less than about 15% and more specifically less than about 5% from the compressed state to the expanded state.

68. The cardiac stent-valve (10) of any one of the preceding configurations, wherein the stent (20) comprises at least one of: a lower tubular portion (26), an upper crown portion (28), a plurality of upstanding commissural supports (21), and/or a plurality of stabilization arches (22).

69. The cardiac stent-valve (10) of configuration 68, wherein the stent (20) comprises the lower tubular portion (26).

70. The cardiac stent-valve (10) of configuration 68, wherein the stent (20) comprises the lower tubular portion (26), the upper crown portion (28), a plurality of upstanding commissural supports (21), and the plurality of stabilization arches (22).

71. The cardiac stent-valve (10) of configuration 70, wherein the lower tubular portion (26) communicates with the upper crown (28) and the commissural supports (21), wherein the commissural supports (21) upstand relative to the upper crown portion (28), and wherein the stabilization arches (22) communicate with the commissural supports (21).

72. The cardiac stent-valve (10) of any one of configurations 70 or 71, wherein, at least in the expanded state, the one or more pre-shaped bulges (110) are positioned between and spaced from respective extremities of both a free edge of the upper crown portion (28), and a free edge of the lower tubular portion (26).

73. The cardiac stent-valve (10) of any one of configurations 69 to 72, wherein, at least in the expanded state, at least one of the one or pre-shaped bulges (110) is arranged at an axial height of the lower tubular portion (26), in particular, at an axial height of an extremity of the lower tubular portion (26) the furthest away from the axial inflow end (20a).

74. The cardiac stent-valve (10) of any one of the preceding configurations, wherein the outer wall (140) and/or the inner tubular wall (130) is formed of material selected from: biological tissue, for instance pericardial tissue, metal, for instance metal foil, synthetic material and combinations thereof.

75. The cardiac stent-valve (10) of configuration 74, wherein the synthetic material is selected from: fabric; hydrogel; foam; sponge; porous fibrous material.

76. The cardiac stent-valve (10) of any one of the preceding configurations, wherein the outer wall (140) and/or the inner tubular wall (130) is formed of material selected from: biologic materials, polymeric materials, fabric materials, permeable materials, impermeable materials, materials that promote tissue ingrowth, materials that retard tissue ingrowth, foam materials, sealing materials, and combinations thereof.

77. The cardiac stent-valve (10) of any one of the preceding configurations if dependent on configuration 9, wherein the one or more pre-shaped bulges (110) is formed of the same or of a different material than generally tubular portion (120).

78. A method for fabricating a sealing skirt (100) of a cardiac stent-valve (10) comprising:
arranging a skirt material (210) on a first mold (220, 230) having a first surface contour (222, 232) with one or more protrusions (226) and/or one or more recesses (236),
bringing the skirt material (210) into contact with the first surface contour (222, 232) such that a shape of the skirt material (210) follows the first surface contour (222, 232) of the first mold (220, 230), and forms one or more bulges (110) corresponding to the one or more protrusions (226) and/or one or more recesses (236),
then holding the skirt material (210) in contact, and
fixing the skirt material (210) during holding.

79. The method of configuration 78, wherein fixing comprises chemically or physically crosslinking a crosslinkable material in the skirt material (210) or heat treating to anneal the skirt material (210).

80. The method of any one of the preceding configurations, wherein holding and/or curing is performed for at least about 12 hours, specifically for at least about 18 hours, and more specifically for at least about 24 hours.

81. The method of any one of the preceding configurations, wherein bringing the skirt material (210) into contact with the first surface contour (222) comprises pressing the skirt material (210) into contact with the first surface contour (222) by an external force.

82. The method of any one of the preceding configurations, wherein pressing the skirt material (210) into contact with the first surface contour (222) by an external force comprises deforming the skirt material (210).

83. The method of any one configurations 81 or 82, wherein the external force is brought up by pressing a second mold (220, 230) against the first mold (220, 230), wherein the second mold (220, 230) has a second surface contour (222, 232) shaped as a negative to the first surface contour (222, 232) of the first mold (220, 230).

84. The method of configuration 83, wherein the first mold (220, 230) is a male mold (220) and has one or more protrusions (226) and wherein the second mold (220, 230) is a female mold (230) and has one or more recesses (236).

85. The method of any one of the preceding configurations, if dependent on configuration 79 wherein after crosslinking and/or heat treating the skirt material (210) in a sheet shape, fixing comprises bringing the skirt material (210) in a cylindrical shape and then connecting two respective side edges (210*a*, 210*b*) of the skirt material (210) to form the sealing skirt (100).
86. The method of any one configurations 83 or 84, wherein the first and second molds (220, 230) are flat molds, and wherein the skirt material (210) is a sheet material which is pressed between the first and second molds (220, 230) by a tightening device (270) which presses the first and second molds (220, 230) together.
87. The method of configuration 86, wherein at least one of the one or more protrusions (226) and/or at least one of the one or more recesses (236) extends from a first side edge (220*a*, 230*a*) to a second side edge (220*b*, 230*b*) of the first and second molds (220, 230), respectively, such that at least one bulge (110) is formed which extends from a first side edge (210*a*) to a second side edge (210*b*) of the skirt material (210).
88. The method of configuration 87, wherein, after crosslinking and/or heat treating, the skirt material (210) is released from the molds (220, 230), brought in a cylindrical shape and then connected at the side edges (210*a*, 210*b*) to form the sealing skirt (100).
89. The method of configuration 88, wherein, the skirt material (210) is brought in the cylindrical shape by arranging it on a cylindrical holding mold (250).
90. The method of any one of configurations 88 or 89, wherein, the side edges (210*a*, 210*b*) of the skirt material (210) are connected by suturing, adhesively attaching or joining.
91. The method of any one configurations 83 or 84, wherein the first mold (220, 230) is a cylindrical holding mold (250), wherein the first surface contour (222, 232) extends on an outer shell surface (252) of the first mold (220, 230), and wherein the skirt material (210) is a sheet material which is pulled over the first mold (220, 230) to cover the outer shell surface (252).
92. The method of configuration 91, wherein the skirt material (210) is pulled over the first mold (220, 230) and/or held in a position covering the outer shell surface (252) by an outer holding mold (260).
93. The method of configuration 92, wherein the outer holding mold (260) is ring shaped.
94. The method of any one of configurations 92 or 93, wherein the outer holding mold (260) is made from a soft material, specifically from silicone.
95. The method of any one of configurations 91 to 94, wherein the second mold (220, 230) is shaped as hollow cylinder which is pressed circumferentially around the first mold (220, 230) by a tightening device (270) after pulling the skirt material (210) over the first mold (220, 230).
96. The method of configuration 95, wherein the second mold (220, 230) comprises two halves of a hollow cylinder which are pressed together by the tightening device (270).
97. The method of any one of configurations 95 or 96, wherein the tightening device (270) comprises a band clip which is attached around an exterior of the second mold (220, 230) and which urges the second mold (220, 230) radially inwardly.
98. The method of any one of configurations 95 to 97, wherein after pressing the second mold (220, 230) around the first mold (220, 230), the skirt material (210) is held in contact at an upper portion and at a lower portion of the first mold (220, 230).
99. The method of any one of configurations 91 to 98 if dependent on configuration 79, wherein, before crosslinking and/or heat treating, an excess portion of the skirt material (210) extending freely below the first mold (220, 230) is removed, specifically cut off.
100. The method of any one of configurations 91 to 99, wherein at least one of the one or more protrusions (226) and/or at least one of the one or more recesses (236) extends circumferentially along the first and second molds (220, 230), respectively, such that at least one bulge (110) is formed in the skirt material (210) which is ring shaped and bulges radially outward.
101. The method of any one configurations 81 or 82, wherein the external force is brought up by arranging clamping elements (280) on an exterior of the skirt material (210).
102. The method of any one of configurations 82 or 82, wherein the first mold (220, 230) is a cylindrical holding mold (250), wherein the first surface contour (222, 232) extends on an outer shell surface (252) of the first mold (220, 230), and wherein the skirt material (210) is a sheet material which is pulled over the first mold (220, 230) to cover the outer shell surface (252).
103. The method of configuration 102, wherein the skirt material (210) is pulled over the first mold (220, 230) and/or held in a position covering the outer shell surface (252) by an outer holding mold (260).
104. The method of configuration 103, wherein the outer holding mold (260) is ring shaped.
105. The method of any one of configurations 103 or 104, wherein the outer holding mold (260) is made from a soft material, specifically from silicone.
106. The method of any one of configurations 101 to 105, wherein the first mold (220, 230) is a male mold, wherein at least one of the one or more protrusions (226) extends circumferentially along the first mold (220, 230) such that at least one bulge (110) is formed in the skirt material (210) which is ring shaped and which bulges radially outward.
107. The method of configuration 106, wherein after pulling the skirt material (210) over the first mold (220, 230), the external force is brought up by arranging clamping elements (280) on an exterior of the skirt material (210), specifically, wherein two clamping elements (280) are arranged directly axially adjacent of a respective bulge (110) on both sides.
108. The method of configuration 107, wherein the clamping elements (280) are compressive rings.
109. The method of any one of configurations 107 or 108, wherein arranging clamping elements (280) on an exterior of the skirt material (210) comprises wrapping strings directly axially adjacent of a respective bulge (110) on both sides to radially compress the skirt material (210) directly axially adjacent of a respective bulge (110) on both sides.
110. The method of any one of configurations 107 to 109, wherein after arranging the clamping elements (280), the skirt material (210) is held in contact at an upper portion and at a lower portion of the first mold (220, 230).
111. The method of any one of configurations 101 to 110 if dependent on configuration 79, wherein, before crosslinking and/or heat treating, an excess portion of the skirt material (210) extending freely below the first mold (220, 230) is removed, specifically cut off.
112. The method of any one of configurations 81 or 82, wherein the external force is brought up by applying fluid pressure to an interior of the skirt material (210).

113. The method of any one configurations 81 or 82, wherein the skirt material (210) is tightly pulled over a conical holding mold (290) and inserted into a correspondingly frustoconically formed hole of the first mold (220, 230) to bring the skirt material (210) into contact with the first surface contour (222, 232) of the first mold (220, 230), wherein the skirt material (210) is pressed radially outward into one or more recesses (236) arranged in the first surface contour (222, 232) by fluid pressure to form one or more bulges (110).

114. The method of configuration 113 if dependent on configuration 79, wherein the fluid pressure is maintained during crosslinking and/or heat treating.

115. The method of any one of the preceding configurations, wherein the skirt material (210) is a sheet material having a first surface (212) and a second surface (214), wherein the first surface (212) is a smooth surface and the second surface (214) is fibrous surface, and wherein the second surface of the skirt material (210) is brought into contact with the first surface contour (222, 232).

116. The method of any one of the preceding configurations, wherein the skirt material (210) is formed of a crosslinkable polymer, for instance PU, or from a biological material, for instance pericardial tissue, specifically bovine pericardial tissue, porcine pericardial tissue or ovine pericardial tissue.

117. The method of any one of the preceding configurations, wherein the first mold (220) and/or the second mold (230) is made from a material selected from: silicone, POM, etc.

118. The method of any one of the preceding configurations, wherein the sealing skirt (100) is configured for reduction or prevention of paravalvular leakage.

119. A cardiac stent-valve (10) for transcatheter delivery, the stent-valve (10) being compressible to a compressed state for delivery, and expandable to an expanded state for implantation, the stent-valve (10) comprising:
 a stent (20) with an axial inflow end (20*a*) and an axial outflow end (20*b*),
 a plurality of leaflets (14) arranged within the stent (20), and
 a sealing skirt (100) for reduction or prevention of paravalvular leakage;
 wherein, in the expanded state, the sealing skirt (100) comprises one or more bulges (110) which are extending radially outward from the sealing skirt (100) and wherein the one or more bulges (110) are pre-formed in the sealing skirt (100).

120. The cardiac stent-valve (10) of configuration 119, wherein a pre-determined shape comprising the one or more bulges (110) is imparted to sealing skirt (100), followed by fixation of the pre-determined shape.

121. The cardiac stent-valve (10) of configuration 120, wherein the fixation involves chemically or physically crosslinking a crosslinkable material in the sealing skirt (100) or subjecting the pre-determined shape of the sealing skirt (100) to an annealing heat treatment.

122. The cardiac stent-valve (10) of any of configurations 119 to 121, wherein the sealing skirt (100) is a unitary body comprising at least one of the one or more pre-formed bulges (110).

123. The cardiac stent-valve (10) of any of configurations 119 to 122, wherein the one or more pre-formed bulges (110) is provided with a shape-memory which facilitates return of compressed bulges (110) to their pre-formed shape upon expansion of the cardiac stent valve (10).

124. The cardiac stent-valve (10) of any of configurations 119 to 123, wherein the sealing skirt (100) comprises a crosslinkable polymer, in particular a polyurethane, or a biological material, in particular pericardial tissue, specifically bovine pericardial tissue, porcine pericardial tissue or ovine pericardial tissue.

125. The cardiac stent-valve (10) of any of configurations 119 to 124, wherein in the expanded state, the sealing skirt (100) comprises a tubular inner wall (130) and at least one pocket (150) which is positioned on the tubular inner wall (130) and comprises an outer wall (140) which extends radially outward from the tubular inner wall (130); wherein the pocket (150) is configured to be distended radially outward in response to inflow of blood in the expanded state; and wherein, in the expanded state, the outer wall (140) of the pocket (150) comprises the one or more pre-formed bulges (110) which extend radially outward from the outer wall (140) of the pocket (150).

126. The cardiac stent-valve (10) of configurations 119 to 125, further comprising the features of at least one or a combination of configurations 1 to 77.

127. The cardiac stent-valve (10) of configuration 1 or any of configurations 119 to 125, wherein the outer wall (140) is formed of biological tissue, in particular pericardial tissue, wherein the one or more pre-shaped bulges (110) are preformed in the outer wall (140) of the pocket (150) by imparting a pre-determined shape to the outer wall (140), followed by fixation of the pre-determined shape, wherein the fixation involves chemically or physically crosslinking a crosslinkable material in the outer wall (140) of the pocket (150), and wherein, the one or more pre-shaped bulges (110) are configured to be extendable radially outward independently of an foreshortening of the stent (20) during expansion.

128. The cardiac stent-valve (10) of configuration 1 or any of configurations 119 to 125, wherein the outer wall (140) is formed of biological tissue, in particular pericardial tissue, wherein the one or more pre-shaped bulges (110) are preformed in the outer wall (140) of the pocket (150) by imparting a pre-determined shape to the outer wall (140), followed by fixation of the pre-determined shape, wherein the fixation involves chemically or physically crosslinking a crosslinkable material in the outer wall (140) of the pocket (150), wherein, the one or more pre-shaped bulges (110) are configured to be extendable radially outward independently of an foreshortening of the stent (20) during expansion, wherein the outer wall (140) comprises a generally tubular portion (120), wherein the one or more pre-shaped bulges (110) are formed in the generally tubular portion (120), and wherein the one or more pre-shaped bulges (110) are formed of the same material as the generally tubular portion (120).

129. The cardiac stent-valve (10) of configuration 1 or any of configurations 119 to 125, wherein the outer wall (140) is formed of biological tissue, in particular pericardial tissue, wherein the one or more pre-shaped bulges (110) are preformed in the outer wall (140) of the pocket (150) by imparting a pre-determined shape to the outer wall (140), followed by fixation of the pre-determined shape, wherein the fixation involves chemically or physically crosslinking a crosslinkable material in the outer wall (140) of the pocket (150), wherein, the one or more pre-shaped bulges (110) are configured to be extendable radially outward independently of an foreshortening of the stent (20) during expansion, wherein the outer wall (140) has a first axial end (140*a*) arranged towards the axial inflow end (20*a*) and a second axial end (140*b*) arranged towards the axial outflow end (20*b*), and wherein the outer wall (140) is attached to the stent (20) via an attachment portion (144) at the first axial end (140*a*) to form a bottom of the pocket (150) conjointly with the inner tubular wall (130)

130. The cardiac stent-valve (10) of configuration 1 or any of configurations 119 to 125, wherein the outer wall (140) is formed of biological tissue, in particular pericardial tissue, wherein the one or more pre-shaped bulges (110) are preformed in the outer wall (140) of the pocket (150) by imparting a pre-determined shape to the outer wall (140), followed by fixation of the pre-determined shape, wherein the fixation involves chemically or physically crosslinking a crosslinkable material in the outer wall (140) of the pocket (150), wherein, the one or more pre-shaped bulges (110) are configured to be extendable radially outward independently of an foreshortening of the stent (20) during expansion, wherein the outer wall (140) has a first axial end (140*a*) arranged towards the axial inflow end (20*a*) and a second axial end (140*b*) arranged towards the axial outflow end (20*b*), and wherein the outer wall (140) is attached to the inner tubular wall (130) via an attachment portion (144) at the first axial end (140*a*) to form a bottom of the pocket (150) conjointly with the inner tubular wall (130).

131. The cardiac stent-valve (10) of configuration 1 or any of configurations 119 to 125, wherein the outer wall (140) is formed of biological tissue, in particular pericardial tissue, wherein the one or more pre-shaped bulges (110) are preformed in the outer wall (140) of the pocket (150) by imparting a pre-determined shape to the outer wall (140), followed by fixation of the pre-determined shape, wherein the fixation involves chemically or physically crosslinking a crosslinkable material in the outer wall (140) of the pocket (150), wherein, the one or more pre-shaped bulges (110) are configured to be extendable radially outward independently of an foreshortening of the stent (20) during expansion, wherein, in the expanded state, at least one of the one or more pre-shaped bulges (110) is configured to be extendable radially outward continuously at least about an angle of about 360° along a circumference of the outer wall (140) to form a closed loop.

132. The cardiac stent-valve (10) of configuration 1 or any of configurations 119 to 125, wherein the outer wall (140) is formed of biological tissue, in particular pericardial tissue, wherein the one or more pre-shaped bulges (110) are preformed in the outer wall (140) of the pocket (150) by imparting a pre-determined shape to the outer wall (140), followed by fixation of the pre-determined shape, wherein the fixation involves chemically or physically crosslinking a crosslinkable material in the outer wall (140) of the pocket (150), wherein, the one or more pre-shaped bulges (110) are configured to be extendable radially outward independently of an foreshortening of the stent (20) during expansion, wherein the outer wall (140) comprises a generally tubular portion (120), and wherein the one or more pre-shaped bulges (110) are formed in the generally tubular portion (120), wherein the one or more pre-shaped bulges (110) are formed of the same material as the generally tubular portion (120), wherein, in the expanded state, the generally tubular portion (120) is distensible radially outward to form a first pocket section (152), and wherein, in the expanded state, each of the one or more pre-shaped bulges (110) is distensible radially outward to extend further radially outward from the generally tubular portion (120) to form a respective second pocket section (154).

133. The cardiac stent-valve (10) of configuration 1 or any of configurations 119 to 125, wherein the outer wall (140) is formed of biological tissue, in particular pericardial tissue, wherein the one or more pre-shaped bulges (110) are preformed in the outer wall (140) of the pocket (150) by imparting a pre-determined shape to the outer wall (140), followed by fixation of the pre-determined shape, wherein the fixation involves chemically or physically crosslinking a crosslinkable material in the outer wall (140) of the pocket (150), wherein, the one or more pre-shaped bulges (110) are configured to be extendable radially outward independently of an foreshortening of the stent (20) during expansion, wherein, the outer wall (140) is a tubular wall such that, at least in the expanded state, the pocket (150) is configured to assume the shape of an annular pocket formed between the inner tubular wall (130) and the outer wall (140), and wherein, at least in the expanded state, the pocket (150) has an annular opening (156) facing in the antegrade direction towards the axial outflow end (20*b*) and being formed between the outer wall 140 and the inner tubular wall 130.

Although specific embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A cardiac stent-valve for transcatheter delivery, the stent-valve being compressible to a compressed state for delivery, and expandable to an expanded state for implantation, the stent-valve comprising:
    a stent with an axial inflow end and an axial outflow end,
    a plurality of leaflets arranged within the stent, and
    a sealing skirt for reduction or prevention of paravalvular leakage;
    wherein, in the expanded state, the sealing skirt comprises a tubular inner wall and a pocket which is positioned on the tubular inner wall and comprises an outer wall which extends radially outward from the tubular inner wall, the outer wall comprising:
        a first axial end connected to the tubular inner wall and disposed toward the axial inflow end, and
        a second axial end disposed towards the axial outflow end;
    wherein the pocket is configured to be distended radially outward in response to inflow of blood in the expanded state; and
    wherein, in the expanded state, the outer wall of the pocket comprises one or more pre-shaped bulges which extend radially outward from the outer wall of the pocket, wherein the one or more pre-shaped bulges are disposed between the first axial end and the axial outflow end of the stent.

2. The cardiac stent-valve of claim 1, wherein the one or more pre-shaped bulges are preformed in the outer wall of the pocket, wherein the one or more pre-shaped bulges are preformed in the outer wall of the pocket by imparting a pre-determined shape to the outer wall, followed by fixation of the pre-determined shape, and
    wherein the fixation involves chemically or physically crosslinking a crosslinkable material in the outer wall of the pocket or subjecting the pre-determined shape of the outer wall of the pocket to an annealing heat treatment.

3. The cardiac stent-valve of claim 1, wherein the one or more pre-shaped bulges comprise or consist of a shape-memory material, wherein the one or more pre-shaped bulges are configured to assume a pre-determined shape in the expanded state.

4. The cardiac stent-valve of claim 1, wherein the outer wall and the one or more pre-shaped bulges form a unitary body.

5. The cardiac stent-valve of claim 1, wherein the outer wall comprises a generally tubular portion, and wherein the one or more pre-shaped bulges are formed in the generally tubular portion, and
wherein the one or more pre-shaped bulges are formed of the same material as the generally tubular portion.

6. The cardiac stent-valve of claim 5, wherein, in the expanded state, the generally tubular portion is distensible radially outward to form a first pocket section.

7. The cardiac stent-valve of claim 5, wherein, in the expanded state, each of the one or more pre-shaped bulges is distensible radially outward to extend further radially outward from the generally tubular portion to form a respective second pocket section.

8. The cardiac stent-valve of claim 1, wherein, in the expanded state, at least one of the one or more pre-shaped bulges is configured to extend radially outward continuously or intermittently at least about an angle of 180° along a circumference of the outer wall.

9. The cardiac stent-valve of claim 1, wherein the outer wall has a first axial end arranged towards the axial inflow end and a second axial end arranged towards the axial outflow end, and wherein the outer wall is attached to the stent and/or the inner tubular wall via an attachment portion at the first axial end to form a bottom of the pocket conjointly with the inner tubular wall.

10. The cardiac stent-valve of claim 1, wherein, the outer wall is a tubular wall such that, at least in the expanded state, the pocket is configured to assume the shape of an annular pocket formed between the inner tubular wall and the outer wall, and
wherein, at least in the expanded state, the pocket has an opening facing in the antegrade direction towards the axial outflow end.

11. The cardiac stent-valve of claim 1, wherein one or more control attachments are formed between the outer wall and the stent and/or between the outer wall and the inner tubular wall, and
wherein the one or more control attachments are configured to permit the outer wall to distend substantially freely, while preventing everting of the outer wall.

12. The cardiac stent-valve of claim 1, wherein, in the expanded state, the one or more pre-shaped bulges are configured to be extendable radially outward independently of a foreshortening of the stent during expansion.

13. The cardiac stent-valve of claim 1, wherein the outer wall and/or the inner tubular wall is formed of material selected from: biological tissue, metal, for instance metal foil, synthetic material and combinations thereof.

14. A cardiac stent-valve for transcatheter delivery, the stent-valve being compressible to a compressed state for delivery, and expandable to an expanded state for implantation, the stent-valve comprising:
a stent with an axial inflow end at a proximal end and an axial outflow end at a distal end,
a plurality of leaflets arranged within the stent, and
a sealing skirt for reduction or prevention of paravalvular leakage;
wherein, in the expanded state, the sealing skirt comprises a tubular inner wall and a pocket which is positioned on the tubular inner wall and comprises an outer wall which extends radially outward from the tubular inner wall, the outer wall comprising:
a first axial end connected to the tubular inner wall and disposed toward the axial inflow end, and
a second axial end disposed toward the axial outflow end;
wherein the pocket is configured to be distended radially outward in response to inflow of blood in the expanded state; and
wherein, in the expanded state, the outer wall of the pocket comprises one or more pre-shaped bulges which extend radially outward from the outer wall of the pocket, wherein the one or more pre-shaped bulges are disposed more distal than the first axial end,
wherein the outer wall comprises a portion that defines the one or more pre-shaped bulges and a portion that does not define a pre-shaped bulge.

15. The cardiac stent-valve of claim 14, wherein the one or more pre-shaped bulges are preformed in the outer wall of the pocket, wherein the one or more pre-shaped bulges are preformed in the outer wall of the pocket by imparting a pre-determined shape to the outer wall, followed by fixation of the pre-determined shape.

16. The cardiac stent-valve of claim 14, wherein the outer wall and the one or more pre-shaped bulges form a unitary body.

17. The cardiac stent-valve of claim 14, wherein the outer wall comprises a generally tubular portion, and wherein the one or more pre-shaped bulges are formed in the generally tubular portion, and
wherein the one or more pre-shaped bulges are formed of the same material as the generally tubular portion.

18. A cardiac stent-valve for transcatheter delivery, the stent-valve being compressible to a compressed state for delivery, and expandable to an expanded state for implantation, the stent-valve comprising:
a stent with an axial inflow end and an axial outflow end,
a plurality of leaflets arranged within the stent, and
a sealing skirt for reduction or prevention of paravalvular leakage;
wherein, in the expanded state, the sealing skirt comprises a tubular inner wall and a pocket which is positioned on the tubular inner wall and comprises an outer wall which extends radially outward from the tubular inner wall, the outer wall comprising:
a first axial end connected to the tubular inner wall and disposed towards the axial inflow end, and
a second axial end disposed towards the axial outflow end;
wherein the pocket is configured to be distended radially outward in response to inflow of blood in the expanded state; and
wherein, in the expanded state, the outer wall of the pocket comprises two pre-shaped bulges which extend radially outward from the outer wall of the pocket, wherein the two pre-shaped bulges are distanced from the first axial end by a non-bulge portion of the outer wall, wherein the two pre-shaped bulges are distanced from the second axial end by a non-bulge portion of the outer wall,
wherein the outer wall defines a first arc, and the two pre-shaped bulges form a second arc and a third arc, wherein the second arc is adjacent to the third arc, and the first arc, the second arc, and the third arc open in a similar direction.

19. The cardiac stent-valve of claim 18, wherein the two pre-shaped bulges are preformed in the outer wall of the pocket, wherein the two pre-shaped bulges are preformed in the outer wall of the pocket by imparting a pre-determined shape to the outer wall, followed by fixation of the pre-determined shape.

20. The cardiac stent-valve of claim 18, wherein the outer wall and the two pre-shaped bulges form a unitary body.

* * * * *